United States Patent
Lian et al.

(10) Patent No.: US 11,715,100 B2
(45) Date of Patent: Aug. 1, 2023

(54) ELECTRONIC SYSTEM AND COMPUTERIZED METHOD FOR VERIFICATION OF TRANSACTING PARTIES TO PROCESS TRANSACTIONS

(71) Applicant: Mastercard Asia/Pacific PTE. LTD., Singapore (SG)

(72) Inventors: Shiying Lian, Singapore (SG); Xijing Wang, Singapore (SG); Bensam Joyson, Singapore (SG); Anupam Sharma, Singapore (SG); Hui Fang, Singapore (SG); Donghao Huang, Singapore (SG); Dipali Pathrabe, Pune (IN); Lalit Manchanda, Gurgaon (IN)

(73) Assignee: Mastercard Asia/Pacific PTE. LTD., Singapore (SG)

( * ) Notice: Subject to any disclaimer, the term of this patent is extended or adjusted under 35 U.S.C. 154(b) by 396 days.

(21) Appl. No.: 17/117,873

(22) Filed: Dec. 10, 2020

(65) Prior Publication Data
US 2021/0182847 A1 Jun. 17, 2021

(30) Foreign Application Priority Data
Dec. 11, 2019 (SG) .......................... 10201911966Q

(51) Int. Cl.
| | |
|---|---|
| *G06Q 20/38* | (2012.01) |
| *H04L 9/32* | (2006.01) |
| *H04L 9/06* | (2006.01) |
| *G06Q 20/42* | (2012.01) |

(52) U.S. Cl.
CPC ..... *G06Q 20/3829* (2013.01); *G06Q 20/3821* (2013.01); *G06Q 20/3823* (2013.01); *G06Q 20/42* (2013.01); *H04L 9/0618* (2013.01); *H04L 9/3213* (2013.01); *H04L 9/3234* (2013.01);
(Continued)

(58) Field of Classification Search
None
See application file for complete search history.

(56) References Cited

U.S. PATENT DOCUMENTS

| | | | |
|---|---|---|---|
| 2016/0173457 A1 | 6/2016 | Syngkon et al. | |
| 2019/0244215 A1 | 8/2019 | Watanabe et al. | |

FOREIGN PATENT DOCUMENTS

CN 105656920 A 6/2016

*Primary Examiner* — Mamon Obeid
*Assistant Examiner* — Zehra Raza
(74) *Attorney, Agent, or Firm* — Pramudji Law Group PLLC; Ari Pramudji

(57) ABSTRACT

The present disclosure generally relates to electronic systems and computerized methods for verification of transacting parties to process transactions. A payment network server receives details of a transaction fulfilled by an agent and generates a transaction identification plaintext. A first party keyset for the first transacting party and an agent keyset for the agent is identified. The server generates cryptograms and ciphertexts encrypted by the first party keyset and agent keyset and sends the cryptograms to the first transacting party and agent. An encrypted cryptogram contains an encrypted ciphertext which contains a plaintext representing the transaction identification plaintext. The ciphertexts are exchanged between the first transacting party and agent by a computer handshake for decryption. The plaintexts are extracted from the ciphertexts and compared against the transaction identification plaintext for verifying the first transacting party and agent.

20 Claims, 16 Drawing Sheets

(52) U.S. Cl.
CPC ...... *G06Q 2220/00* (2013.01); *H04L 2209/56* (2013.01)

ELECTRONIC SYSTEM AND COMPUTERIZED METHOD FOR VERIFICATION OF TRANSACTING PARTIES TO PROCESS TRANSACTIONS

TECHNICAL FIELD

The present disclosure generally relates to electronic systems and computerized methods for verification of transacting parties to process transactions. More particularly, the present disclosure describes various embodiments of electronic systems and computerized methods for verification of transacting parties to process transactions that are fulfilled by an agent by using security keys.

BACKGROUND

Many transactions are performed between users and merchants, such as for purchase of merchandise from the merchants. E-commerce is gaining popularity and greater numbers of users are making online purchases of merchandise through a merchant aggregator which offers merchandise from various merchants. In some instances, a user may request the merchant aggregator to provide a delivery service that collects the purchased merchandise from a merchant and deliver the merchandise to the user. However, there could be some problems which such an arrangement wherein the delivery service sends a delivery vehicle to the merchant to collect the merchandise to deliver to the user. The merchant might not be able to verify if the delivery vehicle is the correct one that is collecting the merchandise for the user, and similarly to verify if the person receiving the merchandise is the correct user who made the purchase.

Therefore, in order to address or alleviate at least one of the aforementioned problems and/or disadvantages, there is a need to provide an improved electronic system and computerized method for verification of transacting parties to process transactions.

SUMMARY

According to an aspect of the present disclosure, there is a payment network server, a computerized method, and a non-transitory computer-readable storage medium comprising instructions for verification of transacting parties to process transactions. The payment network server comprises a transaction module, a security module, and a verification module configured for performing steps of the method.

The transaction module is configured for: receiving, from an application server, details of a transaction comprising identification data of a first transacting party of the transaction, a second transacting party of the transaction, and an agent to fulfill the transaction; and generating an identification plaintext for the transaction.

The security module is configured for: identifying a first party keyset pre-generated for the first transacting party based on the identification data thereof; identifying an agent keyset pre-generated for the agent based on the identification data thereof; generating a first party cryptogram encrypted using the first party keyset, the first party cryptogram comprising a first party ciphertext encrypted using the agent keyset, the first party ciphertext comprising a first party plaintext representing the transaction identification plaintext; generating a first agent cryptogram encrypted using the agent keyset, the first agent cryptogram comprising a first agent ciphertext encrypted using the first party keyset, the first agent ciphertext comprising a first agent plaintext representing the transaction identification plaintext; communicating, to the application server, the transaction identification plaintext and the first party cryptogram for the application server to communicate to a first electronic device of the first transacting party, the first party cryptogram decryptable using the first party keyset to extract the first party ciphertext; and communicating, to an agent server, the transaction identification plaintext and the first agent cryptogram for the agent server to communicate to an electronic device of the agent, the first agent cryptogram decryptable using the agent keyset to extract the first agent ciphertext.

The verification module is configured for: receiving, from the application server, a first party message after the first electronic device has received the first agent ciphertext from the agent electronic device, the first agent ciphertext decryptable using the first party keyset to extract the first agent plaintext; receiving, from the agent server, a first agent message after the agent electronic device has received the first party ciphertext from the first electronic device, the first party ciphertext decryptable using the agent keyset to extract the first party plaintext; and verifying the first transacting party and the agent to facilitate fulfillment of the transaction.

Said verifying of the first transacting party is based on comparison of the first party plaintext extracted from the first party ciphertext against the transaction identification plaintext communicated with the first agent cryptogram. Said verifying of the agent is based on comparison of the first agent plaintext extracted from the first agent ciphertext against the transaction identification plaintext communicated with the first party cryptogram.

An electronic system and computerized method for verification of transacting parties to process transactions according to the present disclosure are thus disclosed herein. Various features, aspects, and advantages of the present disclosure will become more apparent from the following detailed description of the embodiments of the present disclosure, by way of non-limiting examples only, along with the accompanying drawings briefly described below.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated. For purposes of brevity and clarity, descriptions of embodiments of the present disclosure are directed to an electronic system and computerized method for verification of transacting parties to process transactions, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

Overview

Figure 1:
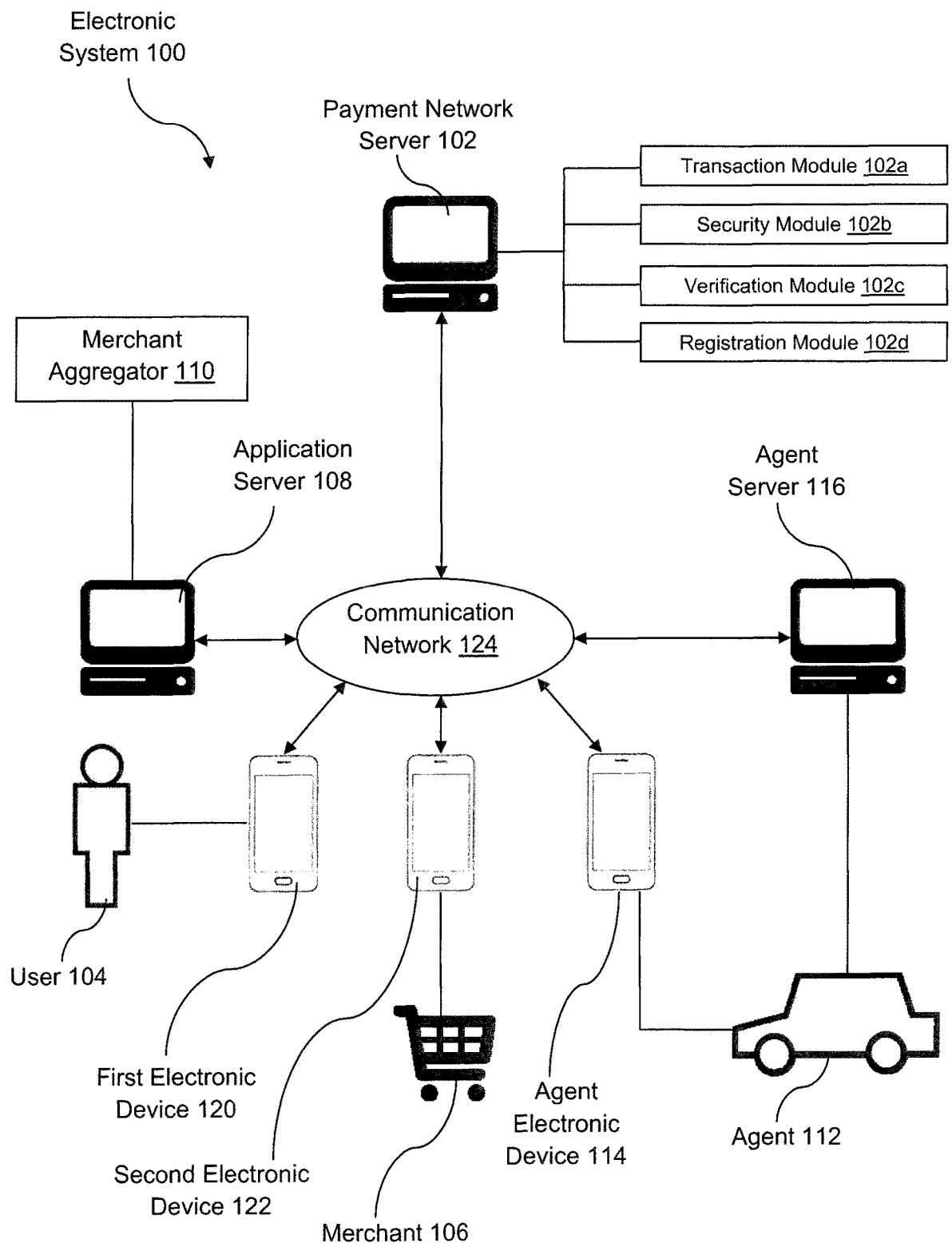
FIG. 1 is an illustration of an electronic system for verification of transacting parties to process transactions, in accordance with embodiments of the present disclosure.

In representative or exemplary embodiments of the present disclosure, there is an electronic or computer system 100 including a payment network server 102 for verification of transacting parties to process transactions, as illustrated in FIG. 1. Each transaction is performed between a first transacting party and a second transacting party. The first transacting party may be a consumer or user 104 and the second transacting party may be a merchant 106, or vice versa. The merchant 106 may be a business or commercial entity operating a physical retail store that offers merchandise for purchase by the user 104. The system 100 includes an application server 108 operated by a merchant aggregator 110. The merchant aggregator 110 may be a business or commercial entity operating a platform for multiple merchants 106 to offer their merchandise for purchase by users 104. The payment network server 102 is communicable with the application server 108 which may be connected with multiple merchant servers of the various merchants 106 for processing transactions between these merchants 106 and the users 104.

The system 100 includes an agent 112 to fulfill the transactions. The agent 112 has an electronic device 114 that is communicable with an agent server 116. The payment network server 102 is communicable with the agent server 116 for sending and receiving information to and from the agent electronic device 114. In some embodiments, the agent 112 is a transport vehicle for fulfilling the transactions between the transacting parties, such as for picking and delivery of merchandise from the merchant 106 to the user 104. The transport vehicle has a vehicle electronic device, such as an electronic dashboard or onboard system, communicable with a vehicle server that is operated by a vehicle manufacturer of the transport vehicle. The transport vehicle may be a standard human-driven vehicle or an autonomous/semi-autonomous vehicle. The merchant aggregator 110 may serve as or partner with an agency that provides the agent 112, such as a transport service provider that provides the transport vehicle, for fulfilling the transactions. In some embodiments, the agent 112 may be provided by one of the merchants 106 which may participate in the platform provided by the merchant aggregator 110. For example, the user 104 makes a first transaction with a first merchant 106 for purchasing a first product, and makes a second transaction with a second merchant 106 for purchasing a second product. The first merchant 106 may collect the second product from the second merchant 106 and deliver both the first and second products to the user 104. The delivery means, e.g. a transport vehicle or delivery person, of the first merchant 106 thus acts as the agent 112 that fulfills both the first and second transactions.

The system 100 includes a first electronic device 120 operated by the first transacting party and a second electronic device 122 operated by the second transacting party. Each of the first electronic device 120 and the second electronic device 122 may be operated by the user 104 or the merchant 106. In many embodiments, the first electronic device 120 is operated by the user 104 to access the platform provided by the merchant aggregator 110 and to purchase the merchandise from one or more merchants 106. Specifically, a software or mobile application is installed and executable on the first electronic device 120 and is communicable with the application server 108 for accessing the platform. The payment network server 102, application server 108, agent electronic device 114, agent server 116, first electronic device 120, and second electronic device 122 are communicable with one another through a communication network 124.

Figure 2A:
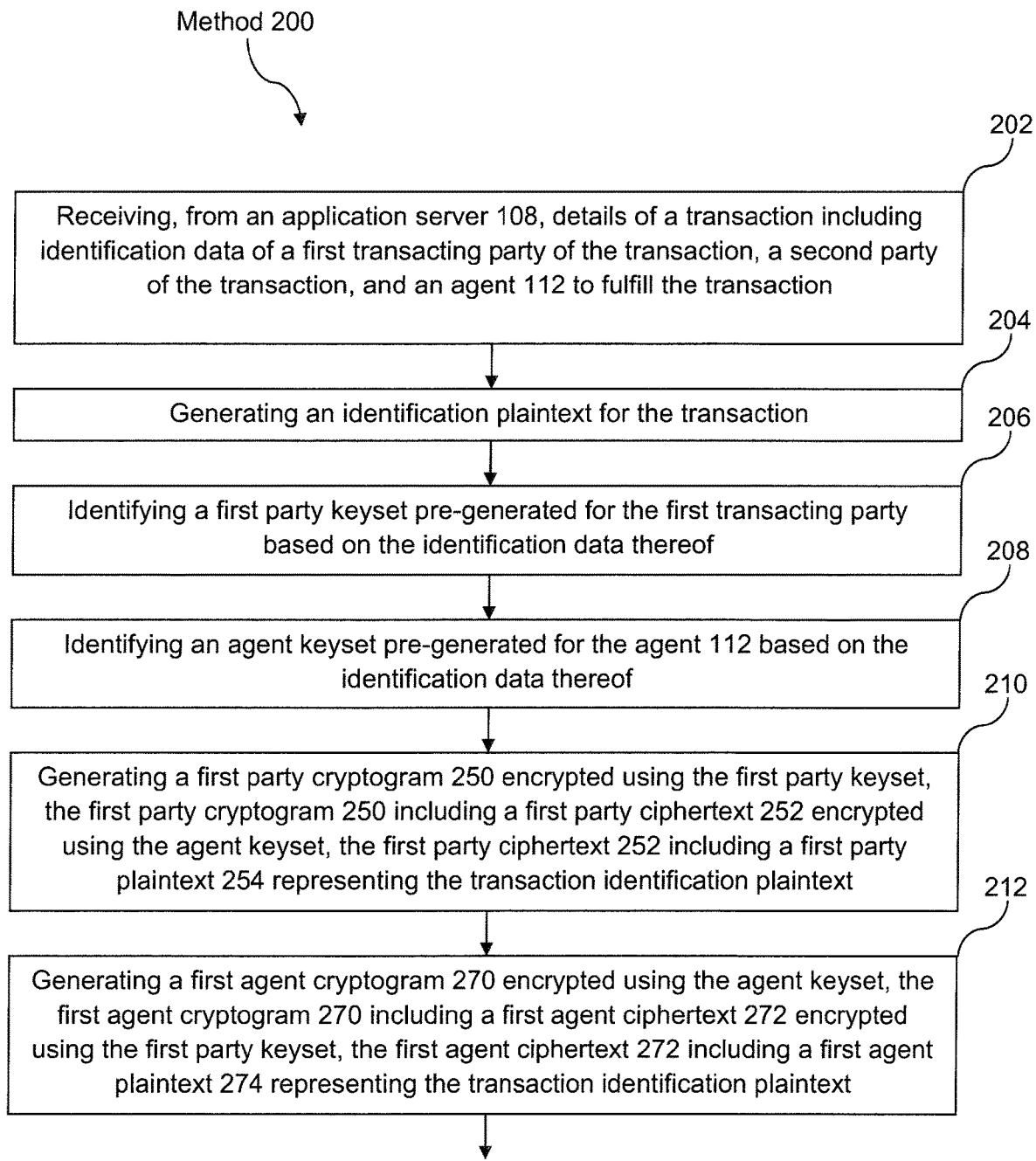
FIG. 2A and FIG. 2B are flowchart illustrations of a computerized method implemented on a payment network server for verification of transacting parties to process transactions, in accordance with embodiments of the present disclosure.
Figure 2B:
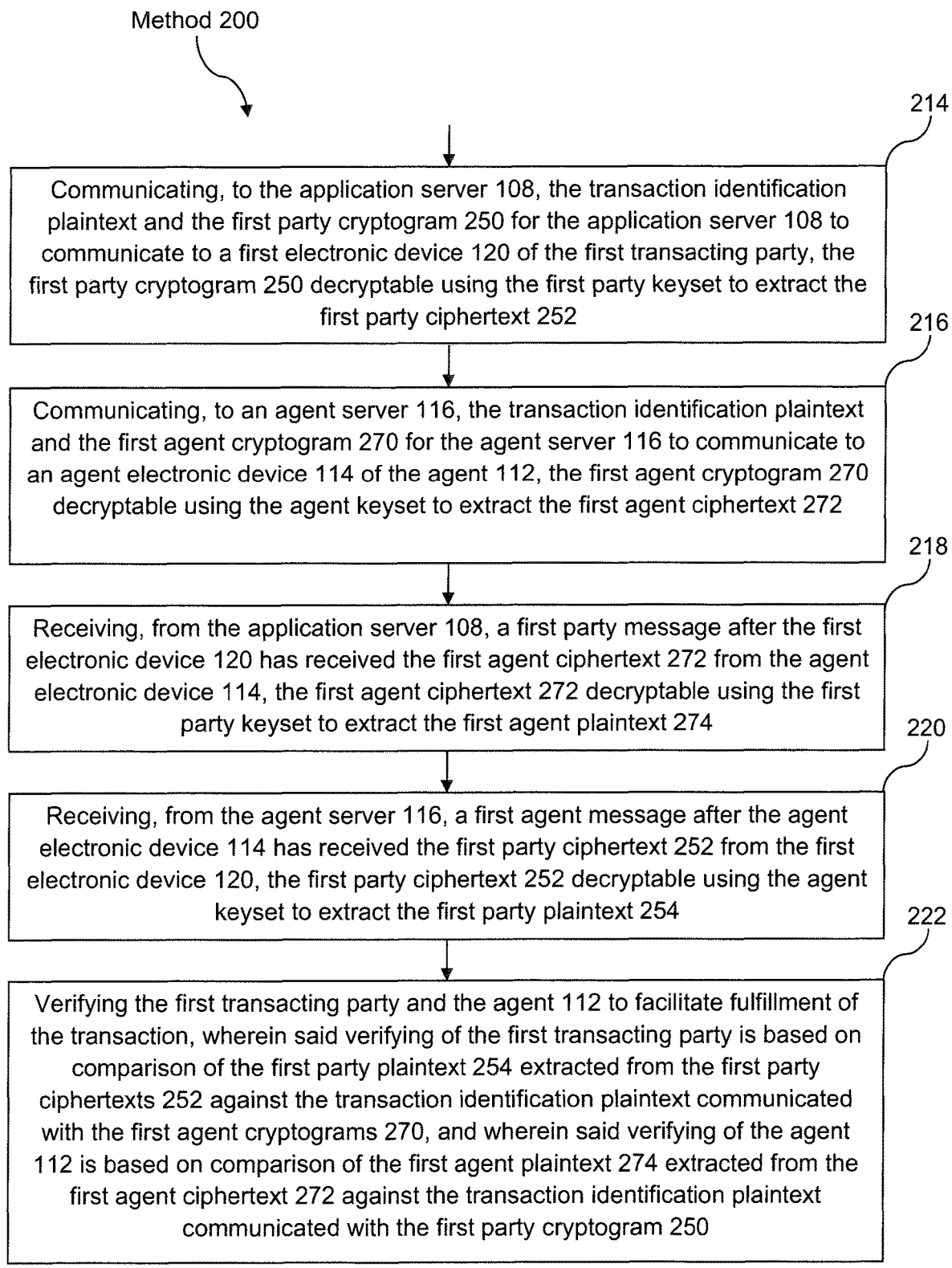

With reference to FIG. 2A and FIG. 2B, there is shown a computer-implemented or computerized method 200 implemented on the payment network server 102 for verification of transacting parties to process transactions. The transacting parties of or to a transaction represent parties who are involved in the transaction, such as a user 104 and a merchant 106. The payment network server 102 includes various modules/omponents for performing various operations or steps of the method 200, including a transaction module 102a, a security module 102b, a verification module 102c, and a registration module 102d.

In a step 202 of the method 200, the transaction module 102a receives, from the application server 108, details of a transaction including identification data of a first transacting party of the transaction, a second transacting party of the transaction, and an agent 112 to fulfill the transaction. The identification data of the agent 112 may include identification data of the agent electronic device 114. In a step 204, the transaction module 102a generates an identification plaintext for the transaction.

In some embodiments, the transaction relates to the user 104 purchasing merchandise from the merchant 106 using the application installed on the first electronic device 120. The user 104 accesses the platform and selects the merchandise from the merchant 106. The purchase merchandise would be subsequently picked up by the agent 112 from a physical retail store of the merchant 106 and delivered to an address indicated by the user 104. The first and second transacting parties are thus the user 104 and the merchant 106, respectively, and the transaction is fulfilled by the agent 112. In some other embodiments, the transaction relates to reservation of the agent 112 which is a transport vehicle for use by the user 104, such as a taxi booking service. The first transacting party is thus the user 104 and the second transacting party is the merchant aggregator 110/transport service provider providing the transport vehicle. Various security keysets are used to verify the identities of the transacting parties. The security keys are generated for the respective electronic devices of the respective transacting parties and may be stored on a security keyset database of the payment network server 102.

In a step 206, the security module 102b identifies a first party keyset pre-generated for the first transacting party based on the identification data thereof. The security module 102b may further identify a second party keyset pre-generated for the second transacting party based on the identification data thereof. In some embodiments, one of the first and second transacting parties is a user 104 and the other is a merchant 106. In a step 208, the security module 102b identifies an agent keyset pre-generated for the agent 112 based on the identification data thereof. In a step 210, the security module 102b generates a first party cryptogram 250 encrypted using the first party keyset. The security module 102b may further generate a second party cryptogram 260 encrypted using the second party keyset. In a step 212, the security module 102b generates a first agent cryptogram 270 encrypted using the agent keyset. The security module 102b may further generate a second agent cryptogram 280 encrypted using the agent keyset.

Figure 2C:
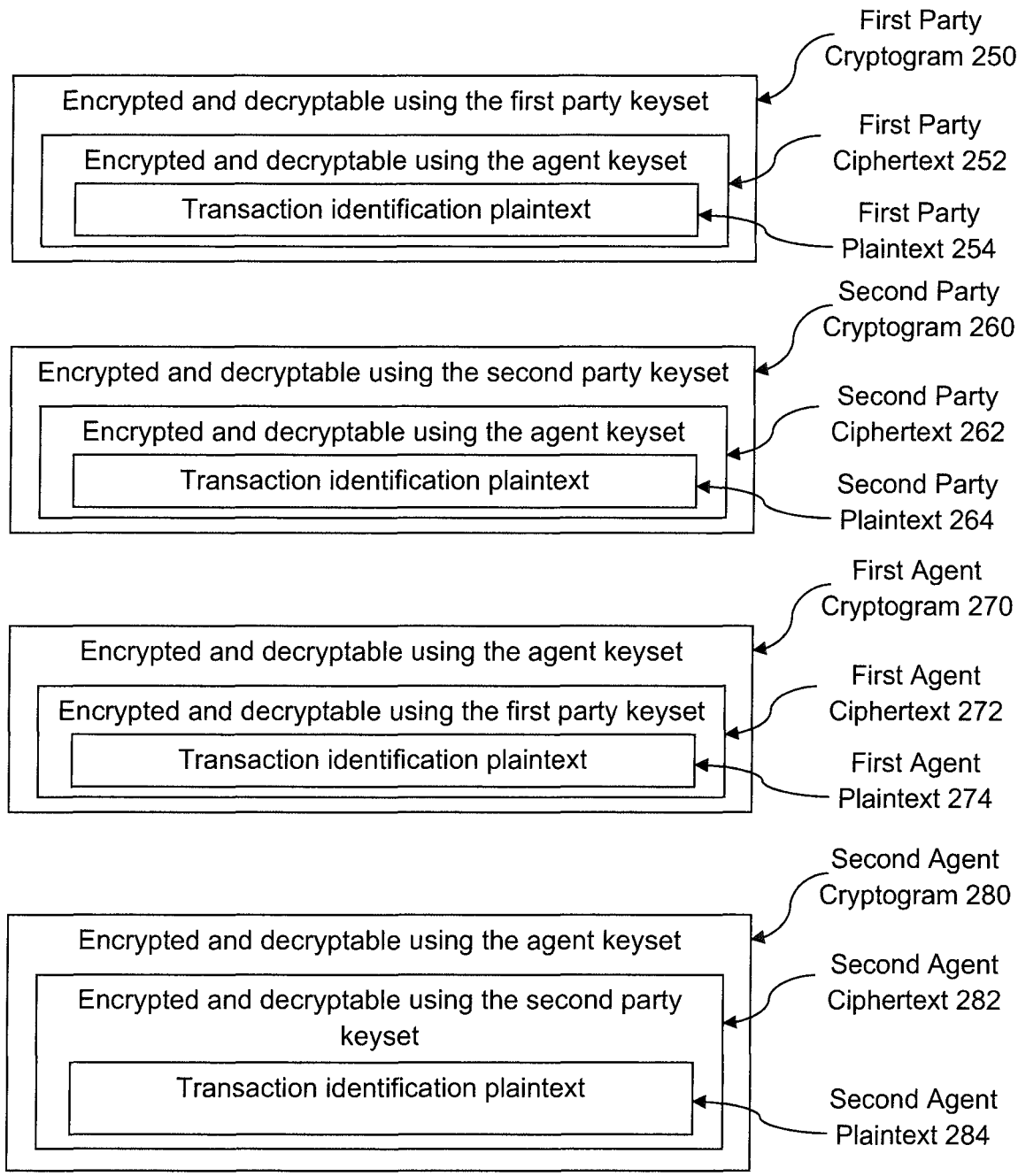
FIG. 2C is a block diagram illustration of cryptograms and ciphertexts for verification of the transacting parties, in accordance with embodiments of the present disclosure.

Further with reference to FIG. 2C, the first party cryptogram 250 is encrypted using the first party keyset and includes a first party ciphertext 252. The first party cryptogram 250 is decryptable using the first party keyset to extract the first party ciphertext 252. The first party ciphertext 252 is encrypted using the agent keyset and includes a first party plaintext 254 representing the transaction identification plaintext. The second party cryptogram 260 is encrypted using the second party keyset and includes a second party ciphertext 262. The second party cryptogram 260 is decryptable using the second party keyset to extract the second party ciphertext 262. The second party ciphertext 262 is encrypted using the agent keyset and includes a second party plaintext 264 representing the transaction identification plaintext. The first agent cryptogram 270 is encrypted using the agent keyset and includes a first agent ciphertext 272. The first agent cryptogram 270 is decryptable using the agent keyset to extract the first agent ciphertext 272. The first agent ciphertext 272 is encrypted using the first party keyset and includes a first agent plaintext 274 representing the transaction identification plaintext. The second agent cryptogram 280 is encrypted using the agent keyset and includes a second agent ciphertext 282. The second agent cryptogram 280 is decryptable using the agent keyset to extract the second agent ciphertext 282. The second agent ciphertext 282 is encrypted using the second party keyset and includes a second agent plaintext 284 representing the transaction identification plaintext.

In a step 214, the security module 102b communicates, to the application server 108, the transaction identification plaintext and the first party cryptogram 250 for the application server 108 to communicate to the first electronic device 120 of the first transacting party. The security module 102b may further communicate, to the application server 108, the transaction identification plaintext and the second party cryptogram 260 for the application server 108 to communicate to the second electronic device 122 of the second transacting party. In a step 216, the security module 102b communicates, to the agent server 116, the transaction identification plaintext, the first agent cryptogram 270, and optionally the second agent cryptogram 280, for the agent server 116 to communicate to the agent electronic device 114 of the agent 112.

In some embodiments, the agent 112, e.g. a delivery person/transport vehicle, goes to the merchant 106 to pick up the merchandise and delivers the merchandise to the user 104. The merchant 106 and the agent 112 would need to verify each other's identity before the agent 112 can pick up the merchandise from the correct merchant 106. Similarly, the user 104 and the agent 112 would need to verify each other's identity before the agent 112 can deliver the merchandise to the correct user 104. In some embodiments, the agent 112 is a transport vehicle that is reserved as a taxi service for the user 104 and the transport vehicle goes to pick up the user 104. The user 104 would need to verify that the transport vehicle is the correct one that he has booked and the transport vehicle would need to verify that the user 104 is the correct person to pick up. Verification is performed by exchanging the ciphertexts between the respective electronic devices. As an example, when the agent 112 arrives at the user 104 location, the user 104 uses the first electronic device 120 to exchange the ciphertexts, specifically the first party ciphertext 252 and first agent ciphertext 272, with the agent electronic device 114.

In a step 218, the verification module 102c receives, from the application server 108, a first party message after the first electronic device 120 has received the first agent ciphertext 272 from the agent electronic device 114, the first agent ciphertext decryptable using the first party keyset to extract the first agent plaintext 274. The verification module 102c may further receive, from the application server 108, a second party message after the second electronic device 122 has received the second agent ciphertext 282 from the agent electronic device 114, the second agent ciphertext 282 decryptable using the second party keyset to extract the second party plaintext 284. In a step 220, the verification module 102c receives, from the agent server 116, a first agent message after the agent electronic device 114 has received the first party ciphertext 252 from the first electronic device 120, the first party ciphertext 252 decryptable using the agent keyset to extract the first party plaintext 254. The verification module 102c may further receive, from the application server 108, a second agent message after the agent electronic device 114 has received the second party ciphertext 262 from the second electronic device 122, the second party ciphertext 262 decryptable using the agent keyset to extract the second party plaintext 264.

In some embodiments, in a step 222, the verification module 102*c* verifies the first transacting party and the agent 112 to facilitate fulfillment of the transaction. Said verifying of the first transacting party is based on comparison of the first party plaintext 254 extracted from the first party ciphertext 252 against the transaction identification plaintext communicated with the first agent cryptogram 270. Said verifying of the agent 112 is based on comparison of the first agent plaintext 274 extracted from the first agent ciphertext 272 against the transaction identification plaintext communicated with the first party cryptogram 250. Similarly, in some other embodiments, the verification module 102*c* verifies the second transacting party and the agent 112 to facilitate fulfillment of the transaction. Said verifying of the second transacting party is based on comparison of the second party plaintext 264 extracted from the second party ciphertext 262 against the transaction identification plaintext communicated with the second agent cryptogram 280. Said verifying of the agent 112 is based on comparison of the second agent plaintext 284 extracted from the second agent ciphertext 282 against the transaction identification plaintext communicated with the second party cryptogram 260.

In some embodiments, one or more of the agent electronic device 114, first electronic device 120, and second electronic device 122 internally stores the respective keysets to decrypt the cryptograms 250/260/270/280 and ciphertexts 252/262/272/282 and extract the transaction identification plaintexts 254/264/274/284 for comparison. In some other embodiments, one or more of the agent electronic device 114, first electronic device 120, and second electronic device 122 communicates the received ciphertexts 252/262/272/282 to the payment network server 102 for extracting the plaintexts 254/264/274/284 for comparison.

As the first electronic device 120 has the first party keyset to decrypt the first agent ciphertext 272 received from the agent electronic device 114 to thereby extract the first agent plaintext 274, the transaction identification plaintexts, one represented by the first agent plaintext 274 and another received with the first party cryptogram 250, can be compared and matched to verify that the agent 112 is the correct one. Similarly, as the agent electronic device 114 has the agent keyset to decrypt the first party ciphertext 252 received from the first electronic device 120 to thereby extract the first party plaintext 254, the transaction identification plaintexts, one represented by the first party plaintext 254 and another received with the first agent cryptogram 270, can be compared and matched to verify that the first transacting party is the correct one. It will be appreciated that comparison of the transaction identification plaintexts would apply similarly or analogously to the second party ciphertext 262 and second agent ciphertext 282 for verifying the second transacting party and the agent 112.

Therefore, the method 200 provides a convenient way for various transacting parties involved in the transaction to verify their identities. Particularly, if the agent 112 is an autonomous transport vehicle without a human operator, the merchant 106 would be able to verify the transport vehicle taking the merchandise, and the transport vehicle would be able to verify the merchant 106 as the correct one before allowing the merchant 106 to access the autonomous vehicle for placing the merchandise inside. Similarly, upon arrival at the user 104, the user 104 would be able to verify the autonomous vehicle as the correct one delivering the merchandise, and the autonomous vehicle would be able to verify the user 104 as the correct person who purchased the merchandise. This verification of transacting parties can be applied in many use cases or applications, such as transactions involving the user 104 and a plurality of merchants 106, as further described in the various embodiments below.

Description of Embodiments

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

As used herein, the terms "a" and "an" are defined as one or more than one. The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment. As used herein, the terms "first" and "second" are used merely as labels or identifiers and are not intended to impose numerical requirements on their associated terms.

As used herein, the terms "component", "module," "system", "apparatus", "interface", and the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component/module. One or more components/modules may reside within a process and/or thread of execution. A component/module may be localized on one computer and/or distributed among a plurality of computers.

While various terms as used in representative or exemplary embodiments of the present disclosure are defined herein, the definitions of these terms are not intended to be limited as such and are in addition to their plain meanings according to standard English dictionaries.

In various embodiments of the present disclosure, the electronic system 100 includes the payment network server 102 for verification of transacting parties to process transactions. The system 100 further includes the application server 108, agent electronic device 114, agent server 116, first electronic device 120, and second electronic device 122, wherein one or more or all of which are communicable with one another through the communication network 124.

The payment network server 102 is a computer server associated with a payment network of various payment instruments and which is operated by an intermediary entity. Typically, the intermediary entity is a card association, such as a credit card association, that facilitates communications between acquirer institutions and issuer institutions to authorize and fund transactions. The payment network settles the transactions between various acquirer institutions and issuer institutions, when payment instruments such as credit cards are used for payment of transactions. One example of a payment network is the Banknet payment network operated by Mastercard. In many embodiments, the payment network server 102 and the payment network associated therewith facilitate verification of transacting parties to process transactions, the transacting parties including the users 104 and merchants 106. The payment network may be integrated with or complements the communication network 124 to facilitate said verification of transacting parties. It will be appreciated that payment of the transactions are processed by the payment network server 102 in a standard manner across the payment network, involving entities such as the acquirer institutions and issuer institutions.

The user 104 is an individual who is an account holder of an account which refers to any financial account, such as current account, savings account, trading account, or any account associated with a user payment instrument. In some embodiments, the account is a bank account maintained by a financial institution, such as an issuer institution or bank. In some other embodiments, the account is a digital wallet maintained the intermediary entity, an issuer institution or bank, or a third-party service provider. The account is linked to the payment instrument and thus the payment instrument stores identification information of the account. The account identification information may be stored in the form of an electronic chip or a machine-readable magnetic strip embedded in the payment instrument. The account identification information may include an account number and the name of the account holder. The payment instrument has a unique identifier, an expiry date, security data, and type.

The payment instrument refers to any suitable cashless payment mechanism, such as payment cards or transaction cards, which the user 104 may use to perform transactions, such as deposits and withdrawals, credit transfers, merchandise purchase, payment transactions, and the like. In some embodiments, the payment instrument is a physical card, such as credit card, debit card, membership card, promotional card, contactless card, charge card, frequent flyer card, gift card, prepaid card, or the like. The payment instrument may be radio frequency identification (RFID) or near field communication (NFC) enabled for performing contactless payment transactions. In some other embodiments, the payment instrument is stored electronically in memory of an electronic device, such as on an application or digital wallet resident or operative on the first electronic device 120 or second electronic device 122.

Each of the agent electronic device 114, first electronic device 120, and second electronic device 122 may be a mobile device, mobile phone, smartphone, personal digital assistant (PDA), key fob, transponder device, NFC-enabled device, tablet, phablet, laptop, computer, other communication device, or the like. The agent 112 may be a transport vehicle and the agent electronic device 114 may be a vehicle electronic device, such as an electronic or computer dashboard of the transport vehicle, that is communicable with the first electronic device 120/second electronic device 122 via contactless communication protocols such as Bluetooth and NFC.

The communication network 124 is a medium or environment through which content, notifications, and/or messages are communicated among various entities, including the payment network server 102, application server 108, agent electronic device 114, agent server 116, first electronic device 120, and second electronic device 122. Some non-limiting examples of the communication network 124 include a virtual private network (VPN), wireless fidelity (Wi-Fi) network, light fidelity (Li-Fi) network, local area network (LAN), wide area network (WAN), metropolitan area network (MAN), satellite network, Internet, fiber optic network, coaxial cable network, infrared (IR) network, radio frequency (RF) network, and any combination thereof. Various entities in the communication network 124 may connect to the communication network 124 in accordance with various wired and wireless communication protocols, such as Transmission Control Protocol/Internet Protocol (TCP/IP), User Datagram Protocol (UDP), 2nd to 5th Generation (2G to 5G) communication protocols, Long Term Evolution (LTE) communication protocols, and any combination thereof. Each of the payment network server 102, application server 108, agent electronic device 114, agent server 116, first electronic device 120, and second electronic device 122 includes a data communication or transceiver module to communicate and transmit/receive data over the communication network 124. Some non-limiting examples of a transceiver module include an antenna module, a radio frequency transceiver module, a wireless transceiver module, a Bluetooth transceiver module, an Ethernet port, a Universal Serial Bus (USB) port, or any other module/component/device configured for transmitting and receiving data.

As described in the method 200, various security keysets are used for encryption and decryption in the verification of the transacting parties. Each keyset may be of a symmetric type or an asymmetric type. Symmetric keysets are used for symmetric cryptography which is executed by only one symmetric key possessed by both parties. The symmetric key is applied to encrypt and decrypt data. Accordingly, a symmetric keyset has a single symmetric key used for both encryption and decryption. The symmetric key is communicable to the respective electronic device for performing decryption of data that has been encrypted by the symmetric key. Asymmetric keysets are pairs of keys for asymmetric cryptography or public key cryptography. An asymmetric keyset has a pair of asymmetric keys including a public key for encryption and a private key for decryption. The private key is communicable to the respective electronic device for performing decryption of data that has been encrypted by the corresponding public key in the same public-private key pair. Each key may be a number, a word, alphanumeric string, or a string of random characters.

The symmetric keysets are generated using a symmetric encryption algorithm such as Advanced Encryption Standard (AES), Twofish, Serpent, Blowfish, Rivest Cipher 4 (RC4), Data Encryption Standard (DES), and Triple DES (3DES), and the like and any combination thereof. The asymmetric keysets are generated using an asymmetric encryption algorithm such as the Rivest-Shamir-Adleman (RSA) algorithm, Diffie-Hellman Key Exchange method, Elliptic-Curve Cryptography (ECC) approach, ElGamal algorithm, and Digital Signature Algorithm (DSA), and the like and any combination thereof. It will be understood by the skilled person that there may be other algorithms, methods, or approaches to generating the symmetric and asymmetric keysets.

The security keysets are generated for the respective electronic devices by a security registration process 300 performed by the registration module 102*d* of the payment network server 102. In some embodiments, the security registration process 300 is performed for the first electronic device 120 of the first transacting party and the agent electronic device 114 of the agent 112. It will be appreciated that the security registration process 300 may be performed for one or more of the agent electronic device 114, the first electronic device 120, and the second electronic device 122 of the second transacting party.

Figure 3:
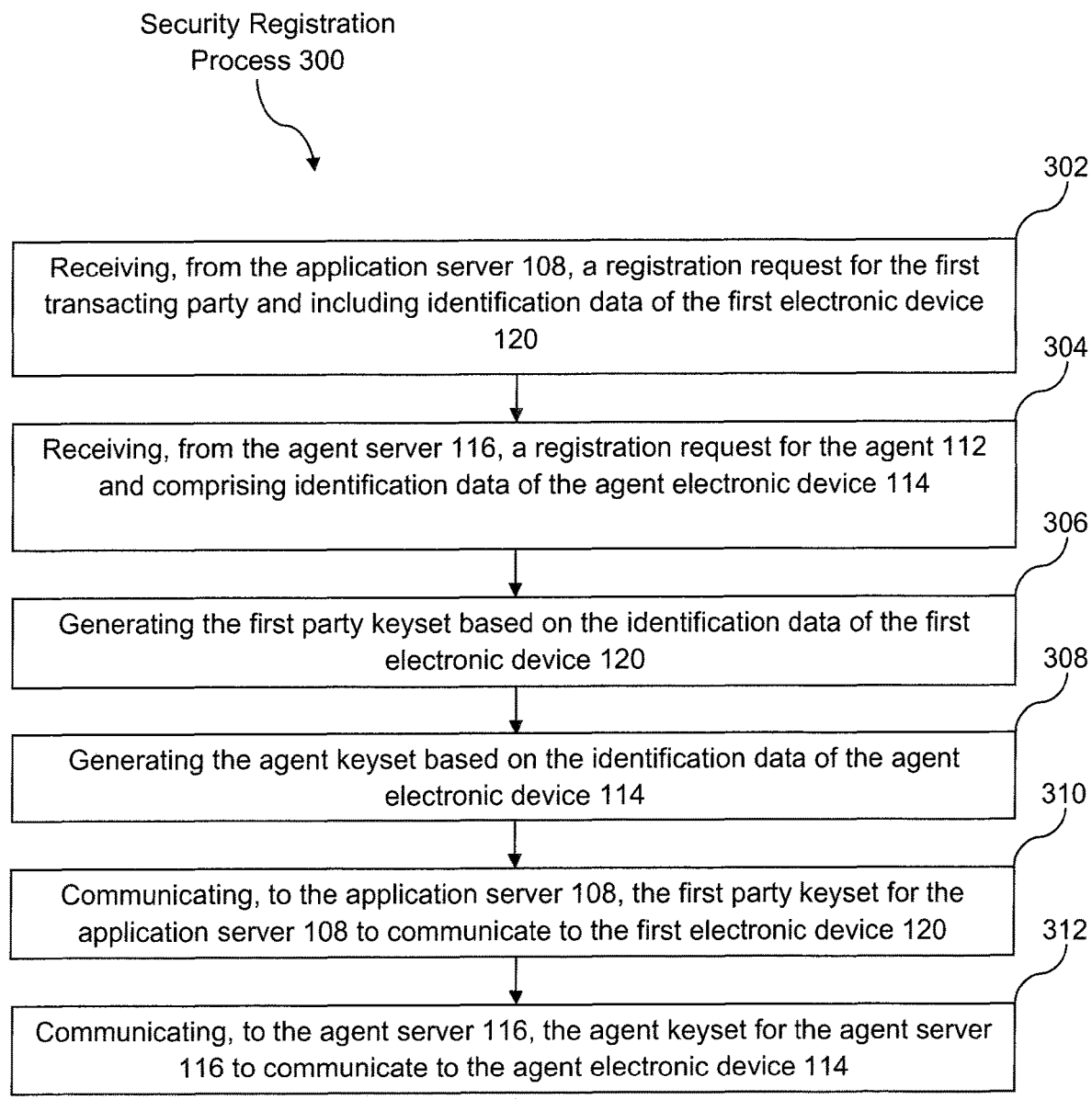
FIG. 3 is a flowchart illustration of a security registration process, in accordance with embodiments of the present disclosure.

With reference to FIG. 3, in a step 302 of the security registration process 300, the registration module 102*d* receives, from the application server 108, a registration request for the first transacting party and including identification data of the first electronic device 120. The registration module 102*d* may further receive, from the application server 108, a registration request for the second transacting party and including identification data of the second electronic device 122. In a step 304, the registration module 102*d* receives, from the agent server 116, a registration request for the agent 112 and including identification data of the agent electronic device 114.

In a step 306, the registration module 102*d* generates the first party keyset based on the identification data of the first electronic device 120. The registration module 102*d* may further generate the second party keyset based on the identification data of the second electronic device 122. In a step 308, the registration module 102*d* generates the agent keyset based on the identification data of the agent electronic device 114. In a step 310, the registration module 102*d* communicates, to the application server 108, the first party keyset for the application server 108 to communicate to the first electronic device 120. The registration module 102*d* may further communicate, to the application server 108, the second party keyset for the application server 108 to communicate to the second electronic device 122. In a step 312, the registration module 102*d* communicates, to the agent server 116, the agent keyset for the agent server 116 to communicate to the agent electronic device 114.

For each electronic device 114/120/122, the identification data may include a hardware identifier such as a media access control (MAC) address. The respective keysets may be generated based on various algorithms, such as hashing using a hash-based message authentication code (HMAC). Additionally, the hardware identifier may be salted with a salt value, which is a random generated number, that adds a layer of security to the hashing algorithm.

As described above with reference to FIG. 2C, each cryptogram 250/260/270/280 is encrypted using the respective keyset and includes the corresponding ciphertexts 252/262/272/282. Each ciphertext 252/262/272/282 is encrypted using the respective keyset and includes the corresponding plaintexts 254/264/274/284 representing the transaction identification plaintext. The transaction identification plaintext as well as the plaintexts 254/264/274/284 representing the transaction identification plaintext contains unencrypted information relevant to the transaction and is readable by the transacting parties, e.g. the user 104 and merchant 106. In contrast, the cryptograms 250/260/270/280 and ciphertexts 252/262/272/282 contains encrypted information relevant to the transaction but is illegible to the transacting parties. Notably, the plaintexts 254/264/274/284 representing the transaction identification plaintext are encrypted twice, i.e. there are two layers of encryption, the first encryption layer in the form of the ciphertexts 252/262/272/282 and the second encryption layer in the form of the cryptograms 250/260/270/280. The transaction identification plaintext may include an identifier of the transaction, such as a unique identification number. The transaction identification plaintext may further include a timestamp of the transaction and optionally a nonce value which is a random generated number.

Figure 4A:
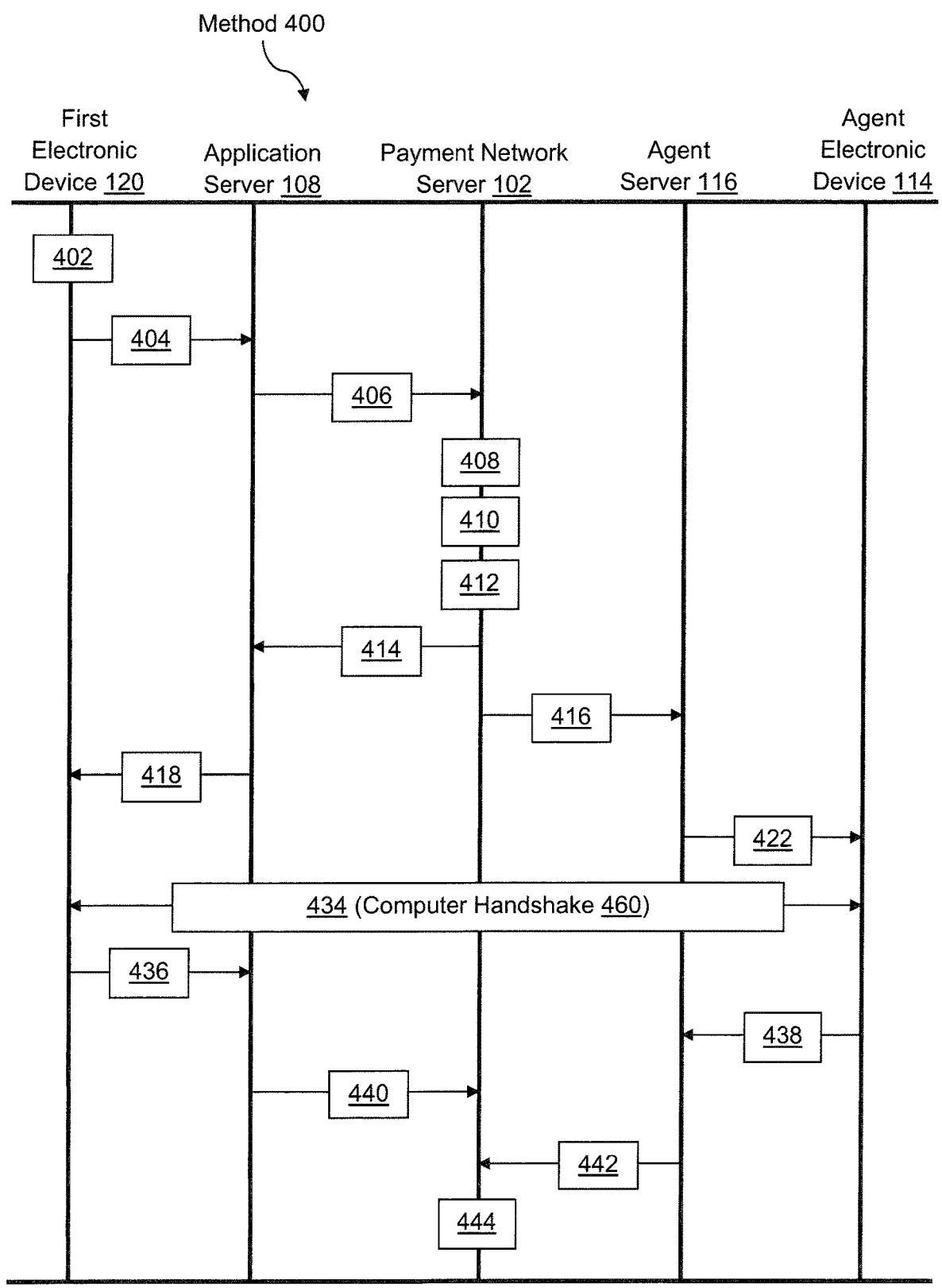
FIG. 4A to FIG. 4B are schematic illustrations of a computerized method implemented on the electronic system for verification of transacting parties to process transactions, in accordance with some embodiments of the present disclosure.
Figure 4B:
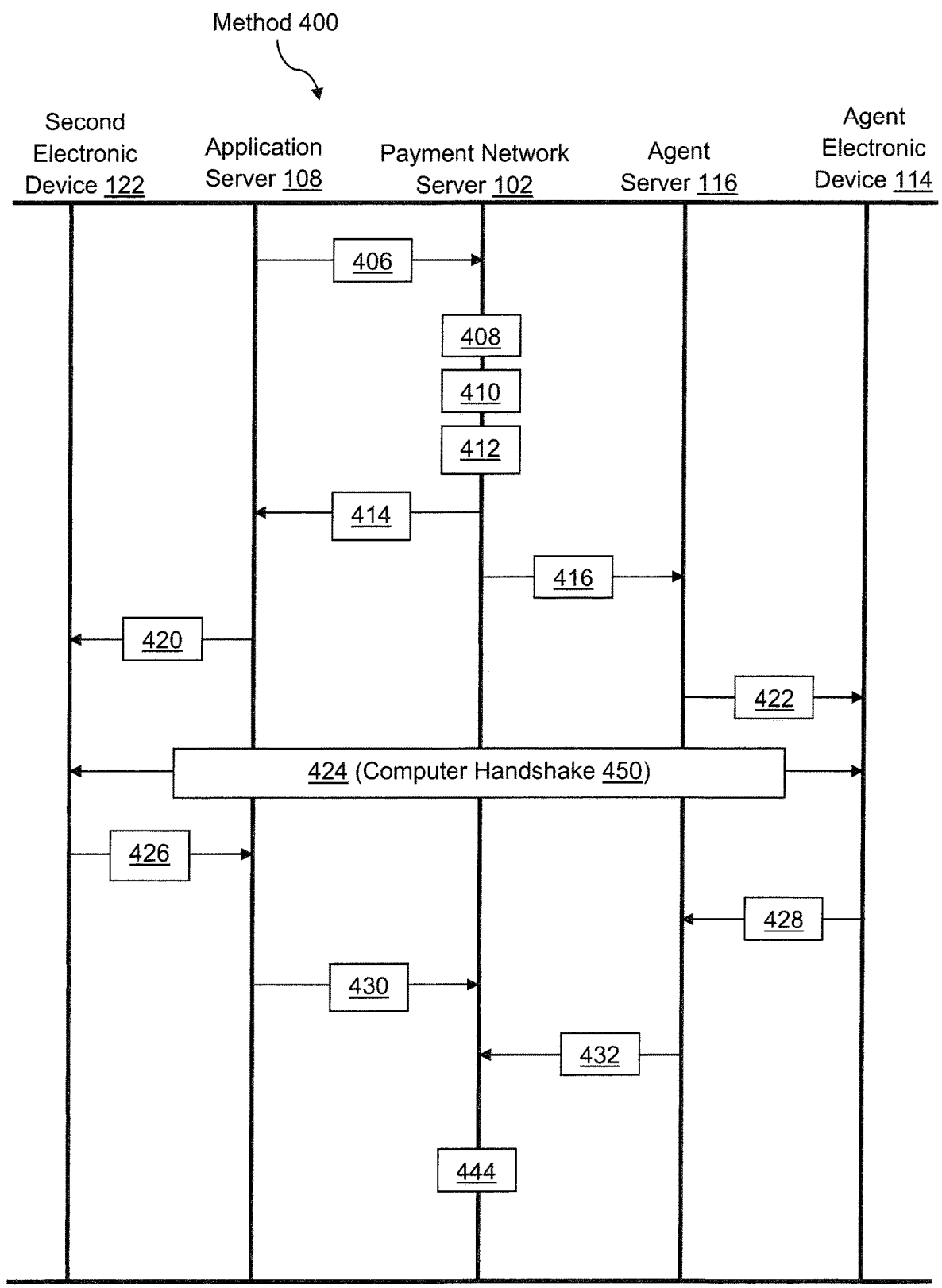

In some embodiments with reference to FIG. 4A and FIG. 4B, there is a computer-implemented or computerized method 400 implemented on the system 100 for verification of transacting parties to process transactions. The transactions relate to the user 104 purchasing merchandise from one or more merchants 106. The merchandise would be picked up by the agent 112, e.g. a transport vehicle, from each merchant 106 and delivered to the user 104. The transport vehicle may be an autonomous/semi-autonomous vehicle such as a drone. The transport vehicle may be provided by the merchant aggregator 110 or one of the merchants 106. Accordingly, in each transaction, the first transacting party is the user 104 and the second transacting party is one of the merchants 106.

In one example, the user 104 makes a first transaction with a first merchant 106 for purchasing a first product and a second transaction with a second merchant 106 for purchasing a second product. The agent 112 or transport vehicle is provided by the merchant aggregator 110. The transport vehicle collects the first and second products from the first and second merchants 106, respectively, and delivers the first and second products to the user 104. Verification of the respective transacting parties is performed by the transport vehicle at the relevant points, i.e. during collection from the respective merchants 106 and during delivery to the user 104. In another example, the user 104 makes a first transaction with a first merchant 106 for purchasing a first product, a second transaction with a second merchant 106 for purchasing a second product, and a third transaction with a third merchant 106 for purchasing a third product. The agent 112 or transport vehicle is provided by the first merchant 106. The transport vehicle collects the first, second, and third products from the first, second, and third merchants 106, respectively, and delivers the first, second, and third products to the user 104. Verification of the respective transacting parties is similarly performed by the transport vehicle at the relevant points. It will be appreciated that verification of the first merchant 106 by the transport vehicle is not necessary if the transport vehicle is provided by the same merchant. Additionally, it may be possible that the transport vehicle is the first product purchased by the user 104.

In a step 402 of the method 400, the user 104 executes the application on the first electronic device 120 to access the platform provided by the merchant aggregator 110. The user 104 then purchases some merchandise from one or more merchants 106. In a step 404, the first electronic device 120 submits the purchase order to the application server 108. In a step 406, the application server 108 communicates, to the payment network server 102, details of the transactions performed between the user 104 and the merchants 106. The transaction details include identification data of the respective transacting parties and the agent 112 provided to fulfill the transaction. The agent 112 may be a transport vehicle provided by the merchant aggregator 110 which may serve as or partner with a transport service provider, or may be provided by one of the merchants 106. The identification data of the agent 112 may include the identification data of the agent electronic device 114 of the agent 112, or other data such as a unique vehicle identifier of the transport vehicle. The application server 108 may communicate with the first electronic device 120 and second electronic devices 122 to inform the user 104 and merchants 106 that the purchase order has been submitted.

In a step 408, the payment network server 102 generates the identification plaintext for each transaction. As stated above, the transaction identification plaintext may include the transaction identifier and optionally a timestamp and a nonce value. In a step 410, the payment network server 102 identifies the first party keyset pre-generated for the user 104, the second party keyset pre-generated for the merchant 106, and the agent keyset pre-generated for the agent 112. In a step 412, the payment network server 102 generates the first party cryptogram 250, second party cryptogram 260, and first agent cryptogram 270, and second agent cryptogram 280. In a step 414, the payment network server 102 communicates the transaction identification plaintext, first party cryptogram 250, and second party cryptogram 260 to the application server 108. In a step 416, the payment network server 102 communicates the transaction identification plaintext, first agent cryptogram 270, and second agent cryptogram 280 to the agent server 116. It will be appreciated that the steps 414 and 416 may occur simultaneously or one after the other.

In a step 418, the application server 108 communicates the transaction identification plaintext and first party cryptogram 250 to the first electronic device 120. In a step 420, the application server 108 communicates the transaction identification plaintext and second party cryptogram 260 to the second electronic device 122 of the merchant 106, such as via a merchant server of the merchant 106. In a step 422, the agent server 116 communicates the transaction identification plaintext, first agent cryptogram 270, and second agent cryptogram 280 to the agent electronic device 114.

Figure 4C:
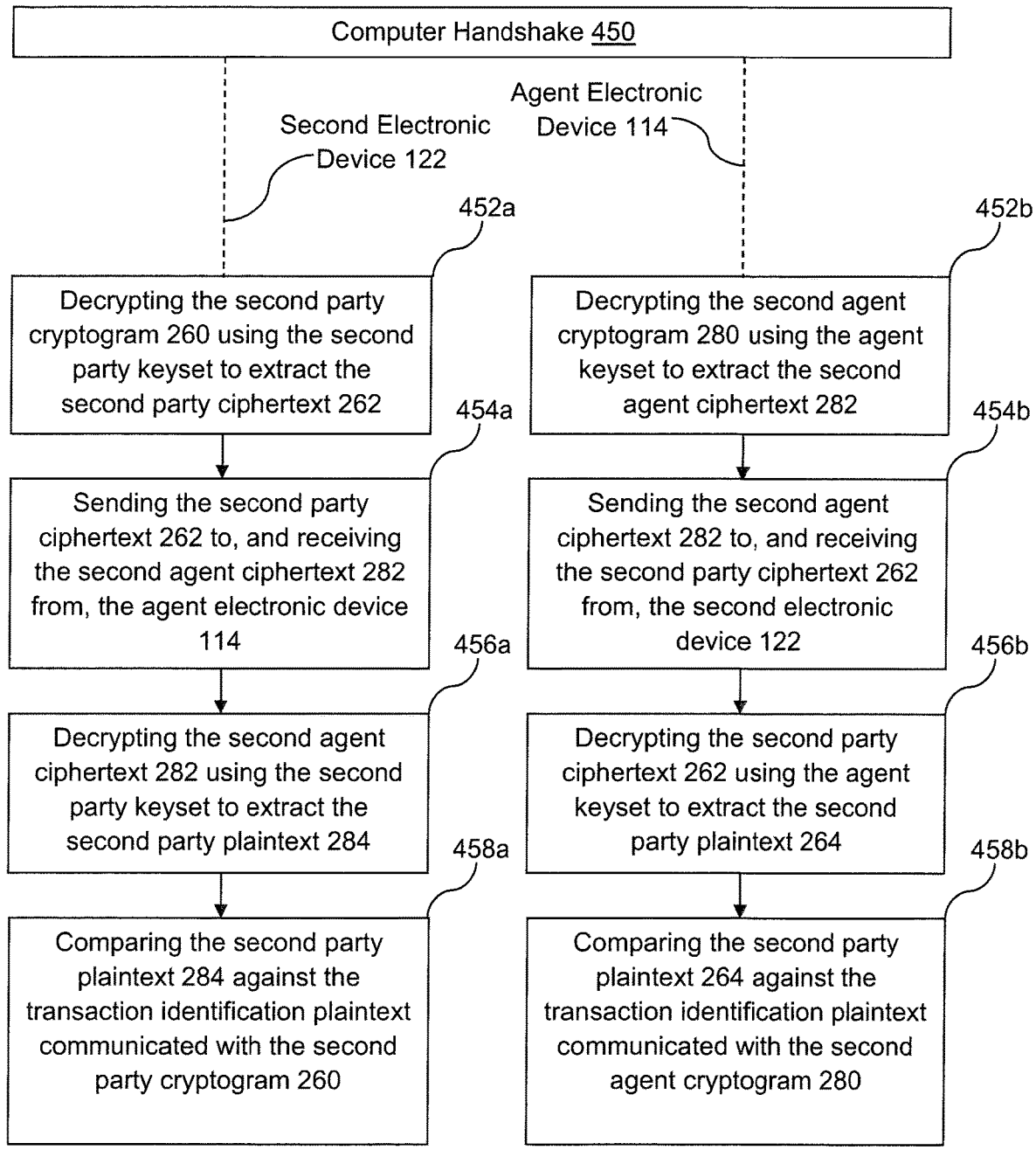
FIG. 4C and FIG. 4D are flowchart illustrations of decrypting the cryptograms and ciphertexts for verification of the transacting parties, in accordance with some embodiments of the present disclosure.

The agent 112 may be provided by the merchant aggregator 110 to fulfill the transaction, and the agent 112, e.g. a delivery person or transport vehicle, goes to the merchant 106 to pick up the merchandise. The merchant 106 and the agent 112 would need to verify each other's identity before the agent 112 can pick up the merchandise from the correct merchant 106. In a step 424, the agent electronic device 114 performs a computer handshake 450 (as shown in FIG. 4C) with the second electronic device 122 to exchange the cryptograms 260/280 and thereby extract the ciphertexts 262/282 and consequently the plaintexts 264/284.

A non-limiting example of the computer handshake 450 is described with reference to the second electronic device 122. In a step 452*a*, the second electronic device 122 decrypts the second party cryptogram 260 using the second party keyset to extract the second party ciphertext 262. In a step 454*a*, the second electronic device 122 sends the second party ciphertext 262 to, and receives the second agent ciphertext 282 from, the agent electronic device 114. In a step 456*a*, the second electronic device 122 decrypts the second agent ciphertext 282 using the second party keyset to extract the second agent plaintext 284. In a step 458*a*, the second electronic device 122 compares the second agent plaintext 284 against the transaction identification plaintext communicated with the second party cryptogram 260 (in the step 420).

A non-limiting example of the computer handshake 450 is described with reference to the agent electronic device 114. In a step 452*b*, the agent electronic device 114 decrypts the second agent cryptogram 280 using the agent keyset to extract the second agent ciphertext 282. In a step 454*b*, the agent electronic device 114 sends the second agent ciphertext 282 to, and receives the second party ciphertext 262 from, the second electronic device 122. In a step 456*b*, the agent electronic device 114 decrypts the second party ciphertext 262 using the agent keyset to extract the second party plaintext 264. In a step 458*b*, the agent electronic device 114 compares the second party plaintext 264 against the transaction identification plaintext communicated with the second agent cryptogram 280 (in the step 422).

Matching of the transaction identification plaintexts would mean that the correct agent 112 is at the correct merchant 106 to pick up the merchandise purchased by the user 104. In a step 426, the second electronic device 122 communicates the second party message to the application server 108. The second party message indicates that the second electronic device 122 has extracted the second agent plaintext 284 from the second agent ciphertext 282 and has compared the transaction identification plaintexts. In a step 428, the agent electronic device 114 communicates the second agent message to the agent server 116. The second agent message indicates that the agent electronic device 114 has extracted the second agent plaintext 264 from the second party ciphertext 262 and has compared the transaction identification plaintexts. In a step 430, the application server 108 communicates the second party message to the payment network server 102. In a step 432, the agent server 116 communicates the second agent message to the payment network server 102.

Figure 4D:
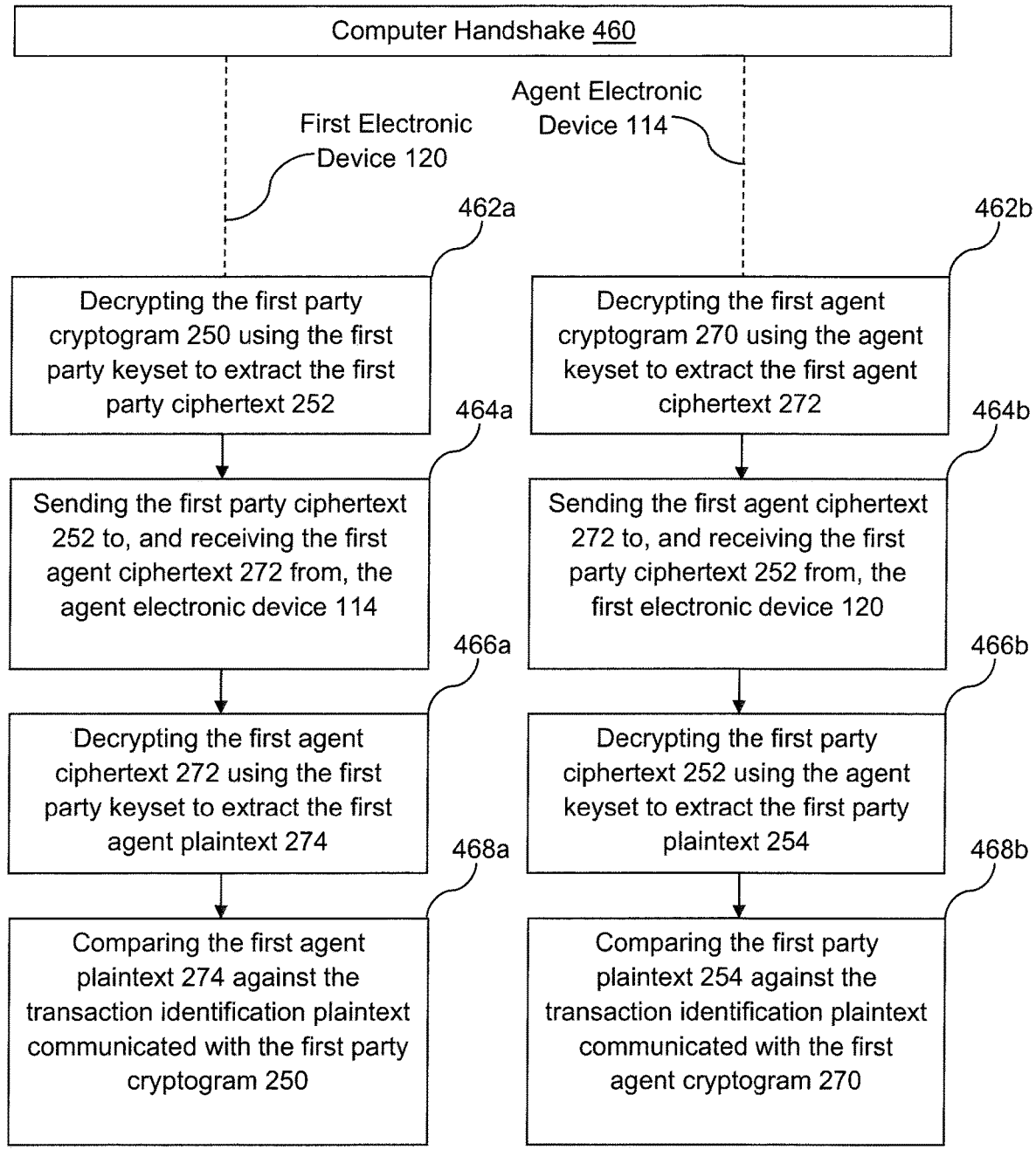

Accordingly, the merchant 106 and agent 112 are successfully verified based on the second party message and second agent message. The agent 112 then collects the merchandise from the merchant 106 and goes to the user 104 to deliver the merchandise. In some embodiments, the agent 112 may go to other merchants 106 to collect other merchandise purchased by the same user 104, such that all the merchandise can be consolidated and delivered to the user 104. It will be appreciated that at each of the other merchants 106, the agent 112 and the merchant 106 verify each other's identity in a similar manner as described above. Similarly, the user 104 and the agent 112 would need to verify each other's identity before the agent 112 can release the merchandise to the correct user 104. In a step 434, the agent electronic device 114 performs a computer handshake 460 (as shown in FIG. 4D) with the first electronic device 120 to exchange the cryptograms 250/270 and thereby extract the ciphertexts 252/272 and consequently the plaintexts 254/274.

A non-limiting example of the computer handshake 460 is described with reference to the first electronic device 120. In a step 462*a*, the first electronic device 120 decrypts the first party cryptogram 250 using the first party keyset to extract the first party ciphertext 252. In a step 464*a*, the first electronic device 120 sends the first party ciphertext 252 to, and receives the first agent ciphertext 272 from, the agent electronic device 114. In a step 466*a*, the first electronic device 120 decrypts the first agent ciphertext 272 using the first party keyset to extract the first agent plaintext 274. In a step 468*a*, the first electronic device 120 compares the first agent plaintext 274 against the transaction identification plaintext communicated with the first party cryptogram 250 (in the step 418).

A non-limiting example of the computer handshake 460 is described with reference to the agent electronic device 114. In a step 462*b*, the agent electronic device 114 decrypts the first agent cryptogram 270 using the agent keyset to extract the first agent ciphertext 272. In a step 464*b*, the agent electronic device 114 sends the first agent ciphertext 272 to, and receives the first party ciphertext 252 from, the first electronic device 120. In a step 466*b*, the agent electronic device 114 decrypts the first party ciphertext 252 using the agent keyset to extract the first party plaintext 254. In a step 468*b*, the agent electronic device 114 compares the first party plaintext 254 against the transaction identification plaintext communicated with the first agent cryptogram 270 (in the step 422).

Matching of the transaction identification plaintexts would mean that the correct agent 112 is at the correct user 104 to deliver the merchandise purchased by the user 104. In a step 436, the first electronic device 120 communicates the first party message to the application server 108. The first party message indicates that the first electronic device 120 has extracted the first agent plaintext 274 from the first agent ciphertext 272 and has compared the transaction identification plaintexts. In a step 438, the agent electronic device 114 communicates the first agent message to the agent server 116. The first agent message indicates that the agent electronic device 114 has extracted the first party plaintext 254 from the first party ciphertext 252 and has compared the transaction identification plaintexts. In a step 440, the application server 108 communicates the first party message to the payment network server 102. In a step 442, the agent server 116 communicates the first agent message to the payment network server 102. It will be appreciated that the application server 108 may communicate the first and second party messages together to the payment network server 102, and the agent server 116 may communicate the first and second agent messages together to the payment network server 102.

In a subsequent step 444, after verifying the user 104 and the merchant 106, the transaction module 102a of the payment network server 102 proceeds to process payment of each transaction as the merchandise have been successfully collected and delivered. Payment of the transaction is processed based on a payment instrument of the user or a payment token associated with the user payment instrument. As will be readily understood by the skilled person, the payment token is a tokenization of the user payment instrument to replace sensitive data thereof with secure surrogate data. Said tokenization may be implemented in a host application or platform such as the Mastercard Digital Enablement Service (MDES) provided by Mastercard®.

The payment token/payment instrument details is communicated from the application server 108 to the payment network server 102 together with the transaction details. Alternatively, the payment network server 102 sends a request to the application server 108 for the payment token/payment instrument details. It will be appreciated that the transaction details and the payment token/payment instrument details are in accordance with one or more standards for the interchange of transaction messages, such as the ISO 8583 standard. It will also be appreciated that payment of the transaction is processed by the payment network server 102 in a standard manner across the payment network, such as via the conventional four-party system or three-party system.

Additionally, payment of the transaction is processed by the payment network server 102 together with other transactions between the user 104 and other merchants 106. For example, as mentioned above, the user 104 may have purchased other merchandise from other merchants 106. All the transactions made by the user 104 with the merchants 106 may be batched together so that a single payment is made on the payment token/user payment instrument.

Figure 5A:
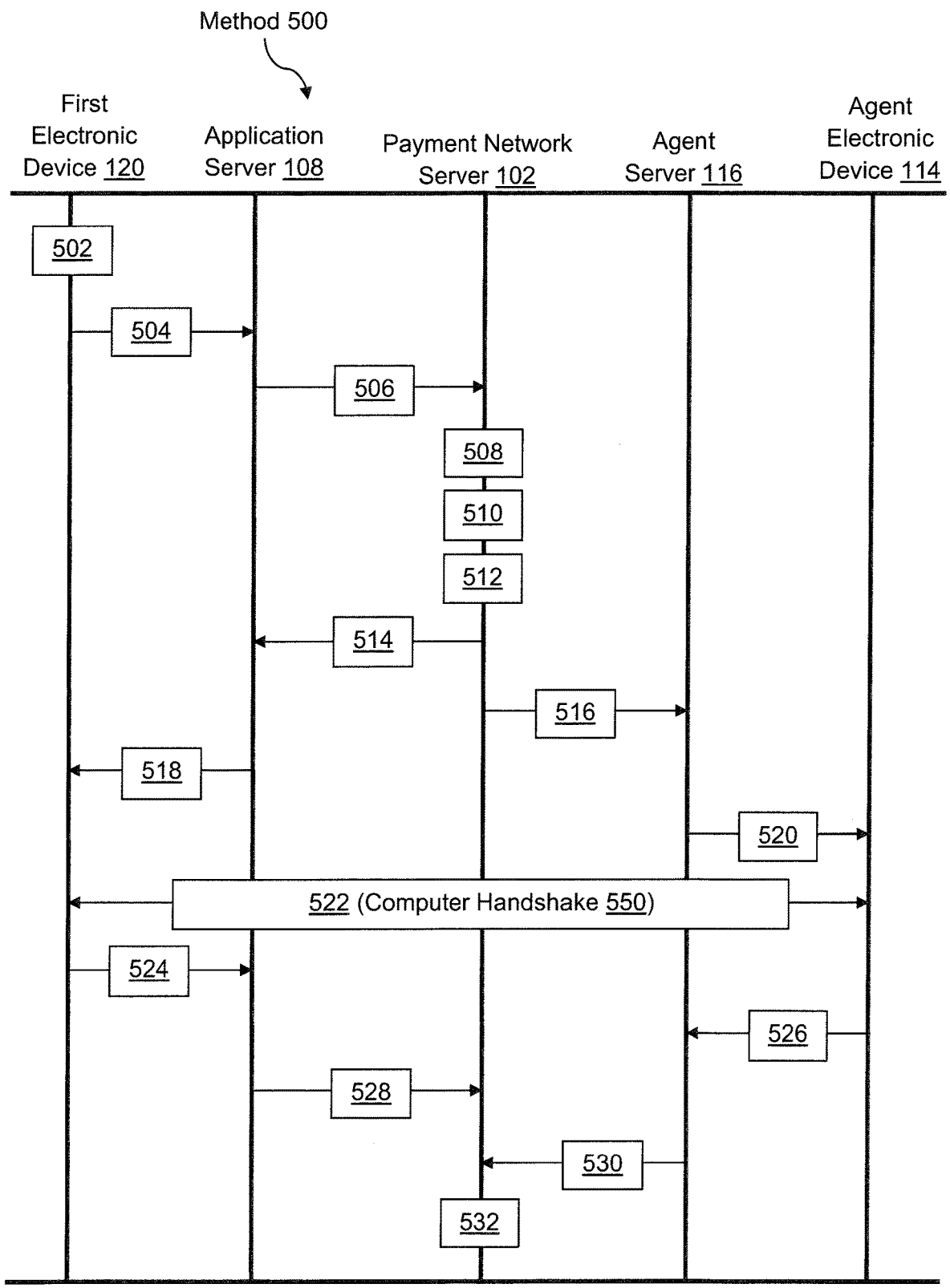
FIG. 5A is a schematic illustration of a computerized method implemented on the electronic system for verification of transacting parties to process transactions, in accordance with some other embodiments of the present disclosure.

In some embodiments with reference to FIG. 5A, there is a computer-implemented or computerized method 500 implemented on the system 100 for verification of transacting parties to process a transaction. The transaction relates to reservation of the agent 112, such as a transport vehicle or rental vehicle, for use by the user 104. In one example, the user 104 may book the transport vehicle as a taxi booking service. The transport vehicle may be an autonomous/semi-autonomous vehicle, e.g. a robo-taxi, that drives itself to the user's address. In another example, the user 104 intends to travel overseas and makes a rental reservation of the transport vehicle at the overseas destination. The merchant aggregator 110 may serve as or partner with a transport service provider that provides the transport vehicle to fulfill this transaction. Accordingly, the first transacting party is the user 104 and the second transacting party is the merchant aggregator 110. It will be appreciated that various aspects of the method 400 apply similarly or analogously to the method 500 and vice versa, and such aspects may be omitted from the description of the method 500 for purpose of brevity.

In a step 502 of the method 500, the user 104 executes the application on the first electronic device 120 to access the platform provided by the merchant aggregator 110. The user 104 then reserves or books the agent 112 using the platform. In a step 504, the first electronic device 120 submits the reservation order to the application server 108. In a step 506, the application server 108 communicates, to the payment network server 102, details of the transaction performed between the user 104 and the merchant aggregator 110.

In a step 508, the payment network server 102 generates the identification plaintext for the transaction. In a step 510, the payment network server 102 identifies the first party keyset pre-generated for the user 104 and the agent keyset pre-generated for the agent 112. In a step 512, the payment network server 102 generates the first party cryptogram 250 and first agent cryptogram 270. In a step 514, the payment network server 102 communicates the transaction identification plaintext and first party cryptogram 250 to the application server 108. In a step 516, the payment network server 102 communicates the transaction identification plaintext and first agent cryptogram 270 to the agent server 116.

Figure 5B:
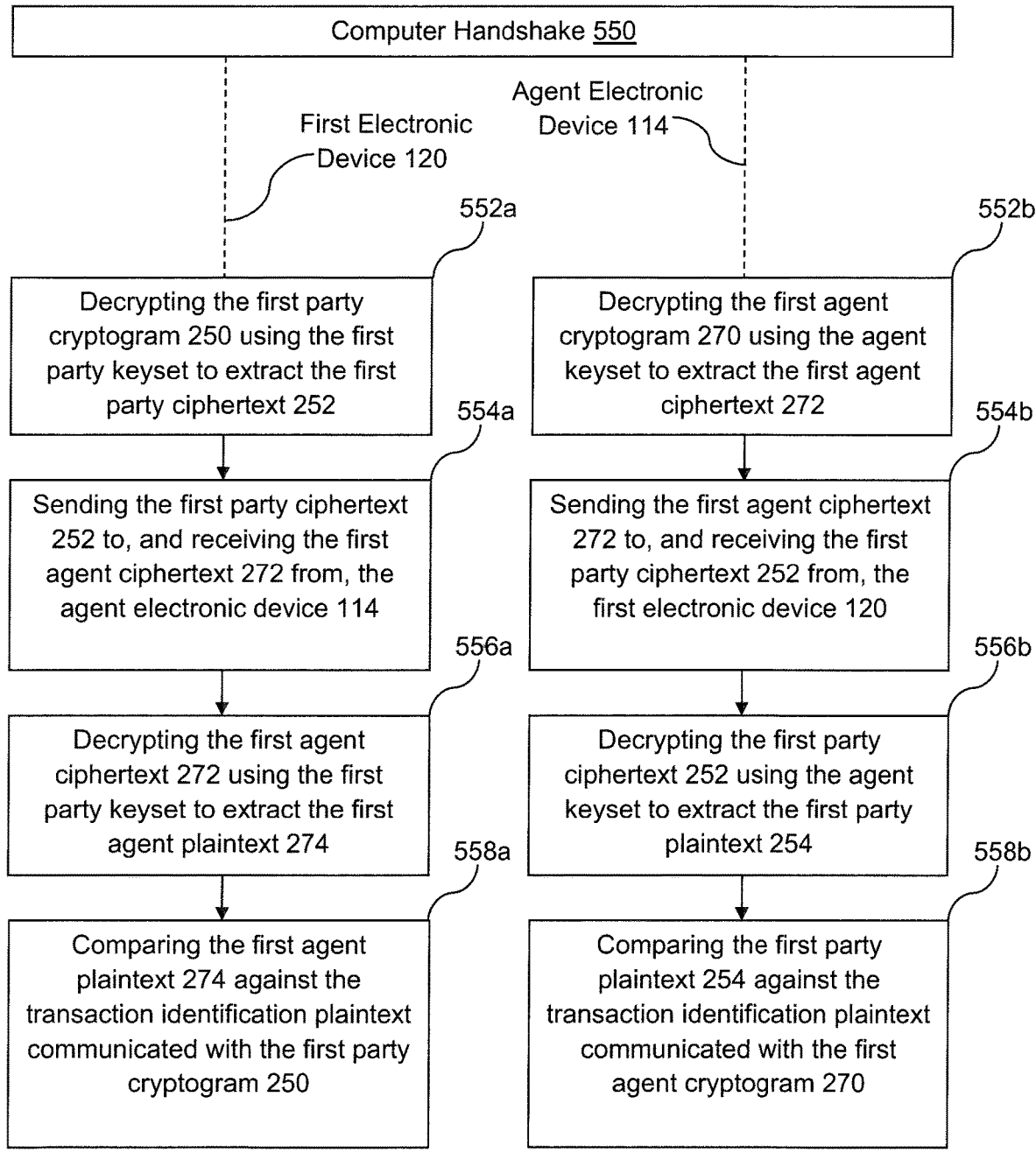
FIG. 5B is a flowchart illustration of decrypting the cryptograms and ciphertexts for verification of the transacting parties, in accordance with some embodiments of the present disclosure.

In a step 518, the application server 108 communicates the transaction identification plaintext and first party cryptogram 250 to the first electronic device 120. In a step 520, the agent server 116 communicates the transaction identification plaintext and first agent cryptogram 270 to the agent electronic device 114. The agent 112 goes to the user 104 for the user 104 to use. As an example, the agent 112 is the transport vehicle for the user 104 to board and use. However, the transport vehicle may be locked and the user 104 and transport vehicle would need to verify each other's identity before the transport vehicle unlocks for the user 104 to board. In a step 522, the agent electronic device 114 performs a computer handshake 550 (as shown in FIG. 5B) with the first electronic device 120 to exchange the cryptograms 250/270 and thereby extract the ciphertexts 252/272 and consequently the plaintexts 254/274.

A non-limiting example of the computer handshake 550 is described with reference to the first electronic device 120. In a step 552a, the first electronic device 120 decrypts the first party cryptogram 250 using the first party keyset to extract the first party ciphertext 252. In a step 554a, the first electronic device 120 sends the first party ciphertext 252 to, and receives the first agent ciphertext 272 from, the agent electronic device 114. In a step 556a, the first electronic device 120 decrypts the first agent ciphertext 272 using the first party keyset to extract the first agent plaintext 274. In a step 558a, the first electronic device 120 compares the first agent plaintext 274 against the transaction identification plaintext communicated with the first party cryptogram 250 (in the step 518).

A non-limiting example of the computer handshake 550 is described with reference to the agent electronic device 114. In a step 552b, the agent electronic device 114 decrypts the first agent cryptogram 270 using the agent keyset to extract the first agent ciphertext 272. In a step 554b, the agent electronic device 114 sends the first agent ciphertext 272 to, and receives the first party ciphertext 252 from, the first electronic device 120. In a step 556b, the agent electronic device 114 decrypts the first party ciphertext 252 using the agent keyset to extract the first party plaintext 254. In a step 558b, the agent electronic device 114 compares the first party plaintext 254 against the transaction identification plaintext communicated with the first agent cryptogram 270 (in the step 520).

Matching of the transaction identification plaintexts would mean that the agent 112 is the correct one that the user 104 has reserved or booked, and that the user 104 is the correct person who has reserved or booked the agent 112. The agent 112 or transport vehicle then unlocks and allows the user 104 to board. In a step 524, the first electronic device 120 communicates the first party message to the application server 108. The first party message indicates that the first electronic device 120 has extracted the first agent plaintext 274 from the first agent ciphertext 272 and has compared the transaction identification plaintexts. In a step 526, the agent electronic device 114 communicates the first agent message to the agent server 116. The first agent message indicates that the agent electronic device 114 has extracted the first party plaintext 254 from the first party ciphertext 252 and has compared the transaction identification plaintexts. In a step 528, the application server 108 communicates the first party message to the payment network server 102. In a step 530, the agent server 116 communicates the first agent message to the payment network server 102.

In a subsequent step 532, after verifying the user 104 and the agent 112, the transaction module 102a of the payment network server 102 proceeds to process payment of the transaction, such as the rental cost, based on the payment token/user payment instrument. Payment of the transaction may be processed after the user 104 boards the transport vehicle or after the user 104 has completed using the transport vehicle, such as at the end of the overseas trip during which the user 104 rents the transport vehicle. Additionally, the user 104 may perform various transactions or activities in the transport vehicle using the agent electronic device 114, as described below. These other transactions may be batched together with the transaction for reserving the transport vehicle, such that so that a single payment is made on the payment token/user payment instrument.

As the user 104 is be renting the transport vehicle during an overseas holiday, the user 104 may sync the first electronic device 120 with the agent electronic device 114, so that the agent electronic device 114 can provide touristic suggestions to the user 104. For example, the agent electronic device 114 may suggest certain dining locations depending on the user's current location and time of day, as well as various family activities of which the user 104 can reserve tickets via the agent electronic device 114. Details of these in-vehicle transactions performed using the agent electronic device 114 would be communicated from the agent electronic device 114 to the agent server 116 and subsequently to the payment network server 102. These in-vehicle transactions can be batched together and paid as a single payment at the end of the holiday together with the transaction for renting the transport vehicle.

Figure 6A:
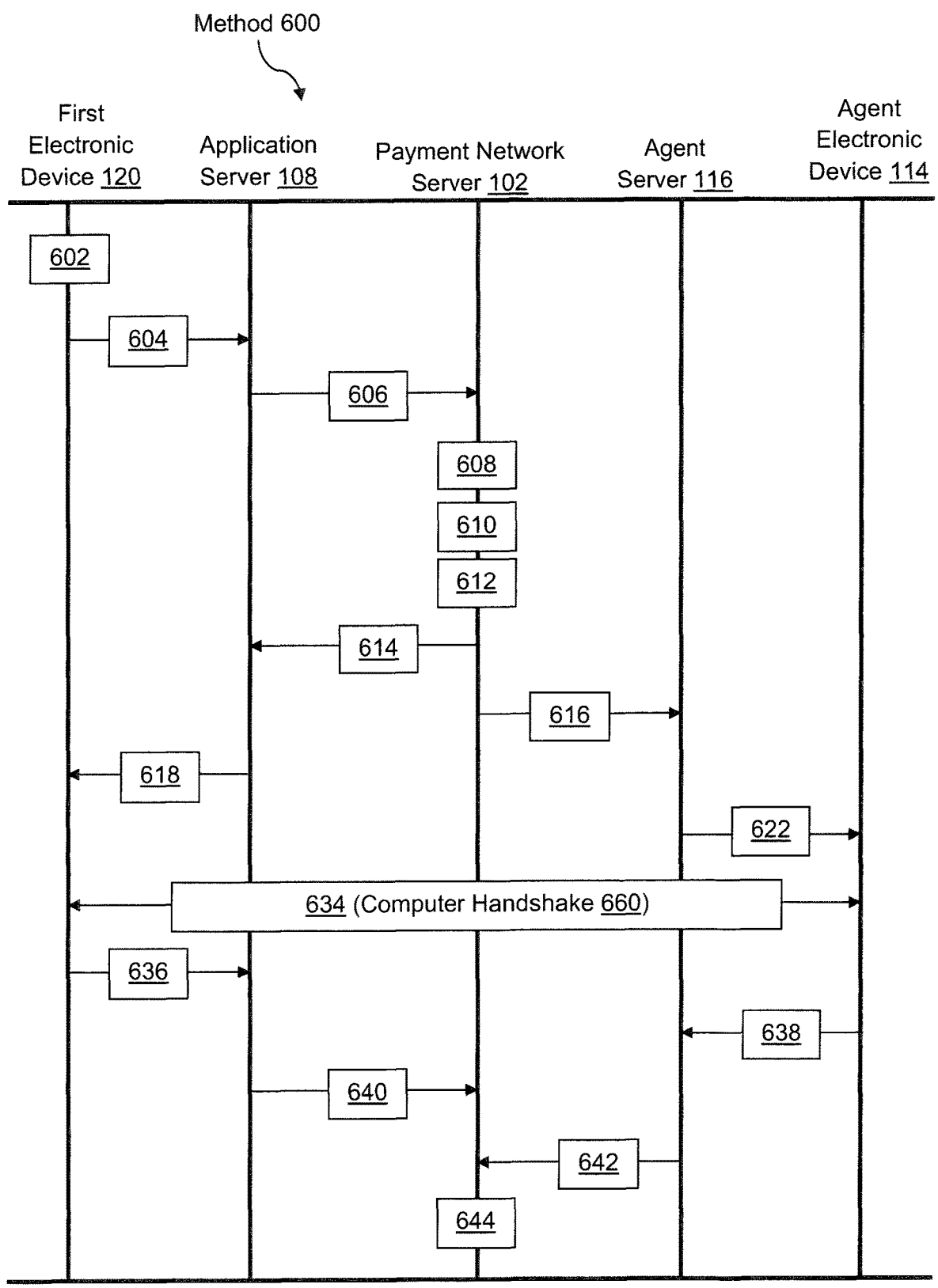
FIG. 6A and FIG. 6B are schematic illustrations of a computerized method implemented on the electronic system for verification of transacting parties to process transactions, in accordance with yet some other embodiments of the present disclosure.
Figure 6B:
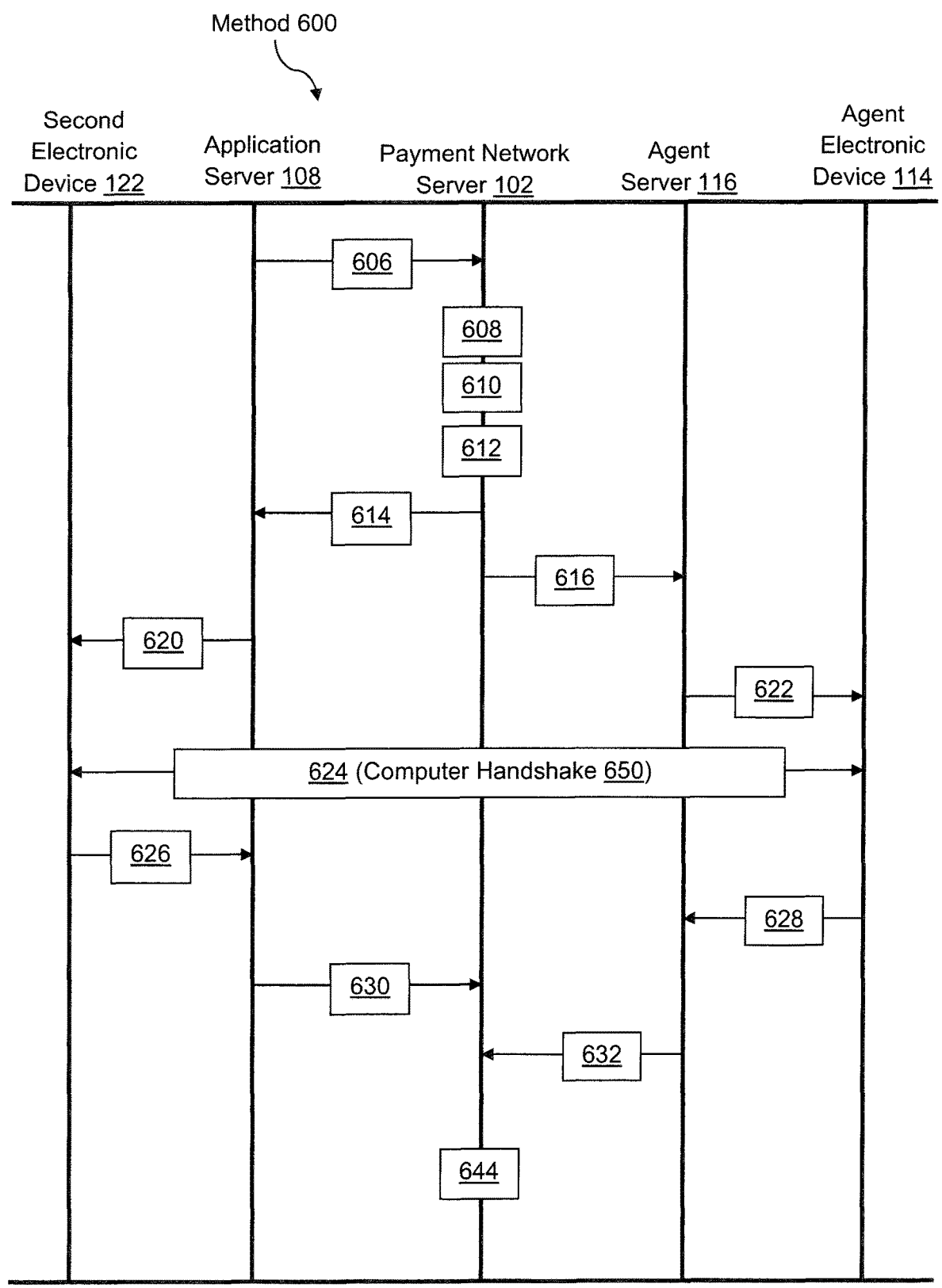

In some embodiments with reference to FIG. 6A and FIG. 6B, there is a computer-implemented or computerized method 600 implemented on the system 100 for verification of transacting parties to process transactions. One of the transactions relates to reservation of the agent 112 for use by the user 104. For example, the agent 112 is a transport vehicle such as an autonomous/semi-autonomous vehicle to drive the user 104 to a destination. Additionally, using the application on the first electronic device 120, the user 104 makes another transaction to order some merchandise, such as a cup of coffee, from a merchant 106. The application may suggest to the user 104 various types of merchandise, such as based on the user's spending history. The transport vehicle would pick up the cup of coffee from the merchant 106 before picking up the user 104, so that the user 104 can consume the cup of coffee in the transport vehicle during the journey to his/her destination. Accordingly, the first transacting party is the user 104 and the second transacting party is the merchant 106, and this transaction is being fulfilled by the transport vehicle. It will be appreciated that various aspects of the methods 400 and 500 apply similarly or analogously to the method 600 and vice versa, and such aspects may be omitted from the description of the method 600 for purpose of brevity.

In a step 602 of the method 600, the user 104 executes the application on the first electronic device 120 to access the platform provided by the merchant aggregator 110. The user 104 then reserves the agent 112 and purchases some merchandise from one or more merchants 106. In a step 604, the first electronic device 120 submits the order to the application server 108. In a step 606, the application server 108 communicates, to the payment network server 102, details of the transactions performed between the user 104 and the merchants 106. The application server 108 may communicate with the first electronic device 120 and second electronic devices 122 to inform the user 104 and merchants 106 that the order has been submitted.

In a step 608, the payment network server 102 generates the identification plaintext for each transaction. In a step 610, the payment network server 102 identifies the first party keyset pre-generated for the user 104, the second party keyset pre-generated for the merchant 106, and the agent keyset pre-generated for the agent 112. In a step 612, the payment network server 102 generates the first party cryptogram 250, second party cryptogram 260, and first agent cryptogram 270, and second agent cryptogram 280. In a step 614, the payment network server 102 communicates the transaction identification plaintext, first party cryptogram 250, and second party cryptogram 260 to the application server 108. In a step 616, the payment network server 102 communicates the transaction identification plaintext, first agent cryptogram 270, and second agent cryptogram 280 to the agent server 116.

In a step 618, the application server 108 communicates the transaction identification plaintext and first party cryptogram 250 to the first electronic device 120. In a step 620, the application server 108 communicates the transaction identification plaintext and second party cryptogram 260 to the second electronic device 122 of the merchant 106. In a step 622, the agent server 116 communicates the transaction identification plaintext, first agent cryptogram 270, and second agent cryptogram 280 to the agent electronic device 114.

Figure 6C:
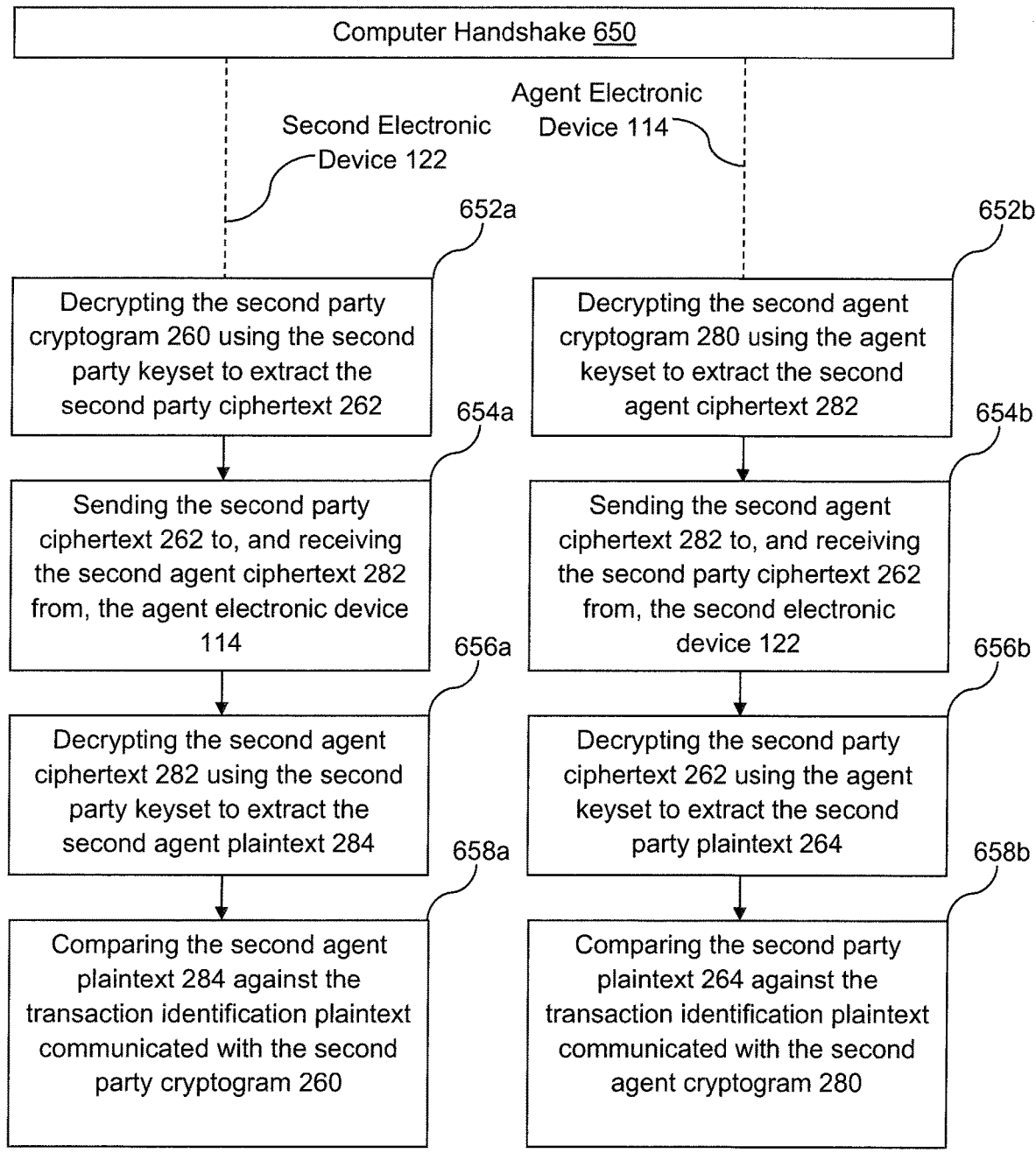
FIG. 6C and FIG. 6D are flowchart illustrations of decrypting the cryptograms and ciphertexts for verification of the transacting parties, in accordance with some embodiments of the present disclosure.

The agent 112 or transport vehicle goes to the merchant 106 to pick up the merchandise. The merchant 106 and the transport vehicle would need to verify each other's identity before the transport vehicle can pick up the merchandise from the correct merchant 106. In a step 624, the agent electronic device 114 performs a computer handshake 650 (as shown in FIG. 6C) with the second electronic device 122 to exchange the cryptograms 260/280 and thereby extract the ciphertexts 262/282 and consequently the plaintexts 264/284.

A non-limiting example of the computer handshake 650 is described with reference to the second electronic device 122. In a step 652a, the second electronic device 122 decrypts the second party cryptogram 260 using the second party keyset to extract the second party ciphertext 262. In a step 654a, the second electronic device 122 sends the second party ciphertext 262 to, and receives the second agent ciphertext 282 from, the agent electronic device 114. In a step 656a, the second electronic device 122 decrypts the second agent ciphertext 282 using the second party keyset to extract the second agent plaintext 284. In a step 658a, the second electronic device 122 compares the second agent plaintext 284 against the transaction identification plaintext communicated with the second party cryptogram 260 (in the step 620).

A non-limiting example of the computer handshake 650 is described with reference to the agent electronic device 114. In a step 652b, the agent electronic device 114 decrypts the second agent cryptogram 280 using the agent keyset to extract the second agent ciphertext 282. In a step 654b, the agent electronic device 114 sends the second agent ciphertext 282 to, and receives the second party ciphertext 262 from, the second electronic device 122. In a step 656b, the agent electronic device 114 decrypts the second party ciphertext 262 using the agent keyset to extract the second party plaintext 264. In a step 658b, the agent electronic device 114 compares the second party plaintext 264 against the transaction identification plaintext communicated with the second agent cryptogram 280 (in the step 622).

Matching of the transaction identification plaintexts would mean that the correct agent 112 is at the correct merchant 106 to pick up the merchandise purchased by the user 104. In a step 626, the second electronic device 122 communicates the second party message to the application server 108. In a step 628, the agent electronic device 114 communicates the second agent message to the agent server 116. In a step 630, the application server 108 communicates the second party message to the payment network server 102. In a step 632, the agent server 116 communicates the second agent message to the payment network server 102.

Figure 6D:
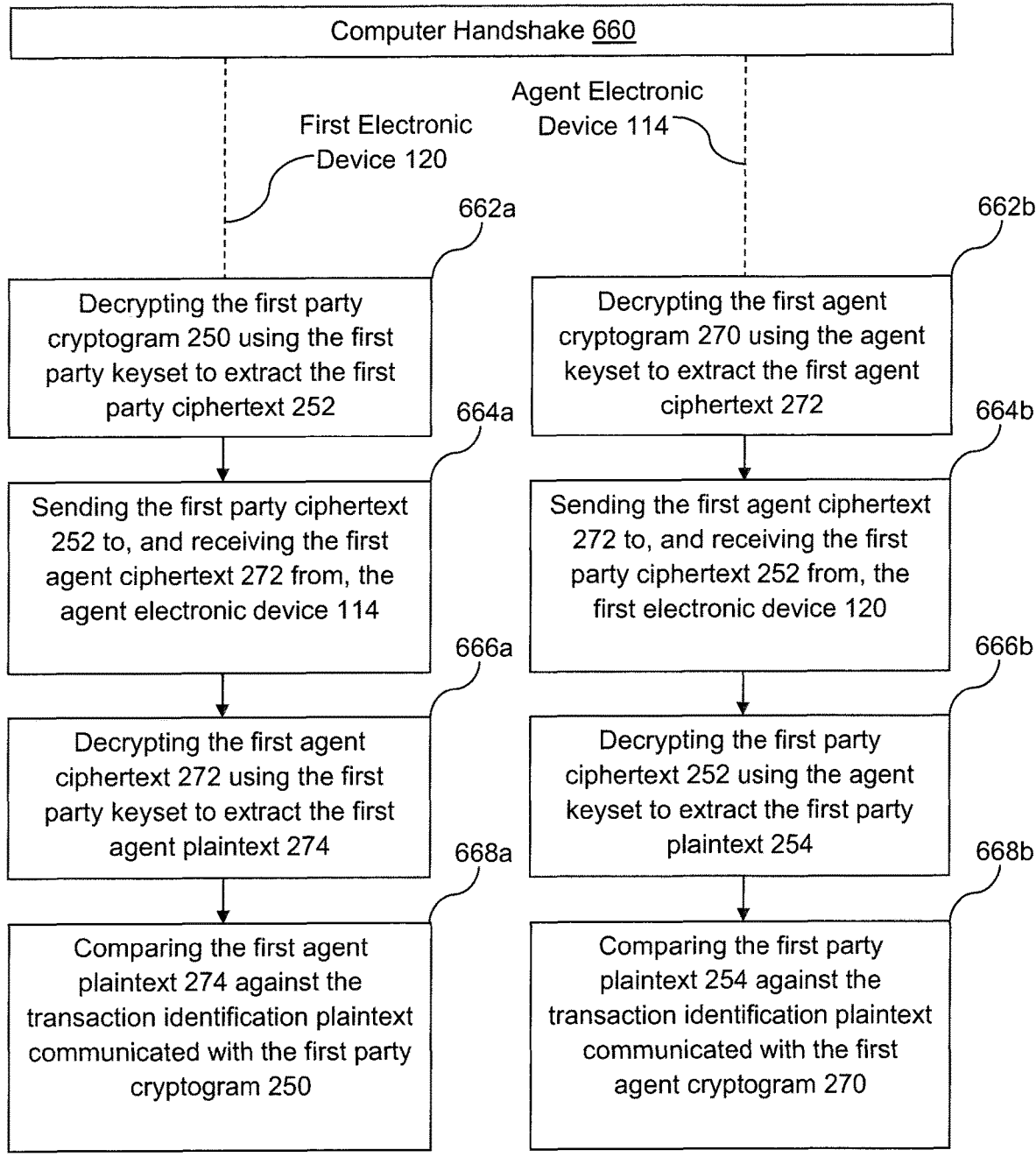

Accordingly, the merchant 106 and agent 112 are successfully verified based on the second party message and second agent message. As an example, the agent 112 is the transport vehicle which, upon verification, unlocks to allow the merchant 106 to place the merchandise inside the transport vehicle. The transport vehicle then carries the merchandise and goes to the user 104 to pick up the user 104. In some embodiments, the transport vehicle may go to other merchants 106 to collect other merchandise purchased by the user 104 before picking up the user 104. Upon arrival at the user 104, the user 104 and the transport vehicle would need to verify each other's identity before the transport vehicle unlocks for the user 104 to board. In a step 634, the agent electronic device 114 performs a computer handshake 660 (as shown in FIG. 6D) with the first electronic device 120 to exchange the cryptograms 250/270 and thereby extract the ciphertexts 252/272 and consequently the plaintexts 254/274.

A non-limiting example of the computer handshake 660 is described with reference to the first electronic device 120. In a step 662a, the first electronic device 120 decrypts the first party cryptogram 250 using the first party keyset to extract the first party ciphertext 252. In a step 664a, the first electronic device 120 sends the first party ciphertext 252 to, and receives the first agent ciphertext 272 from, the agent electronic device 114. In a step 666a, the first electronic device 120 decrypts the first agent ciphertext 272 using the first party keyset to extract the first agent plaintext 274. In a step 668a, the first electronic device 120 compares the first agent plaintext 274 against the transaction identification plaintext communicated with the first party cryptogram 250 (in the step 618).

A non-limiting example of the computer handshake 660 is described with reference to the agent electronic device 114. In a step 662b, the agent electronic device 114 decrypts the first agent cryptogram 270 using the agent keyset to extract the first agent ciphertext 272. In a step 664b, the agent electronic device 114 sends the first agent ciphertext 272 to, and receives the first party ciphertext 252 from, the first electronic device 120. In a step 666b, the agent electronic device 114 decrypts the first party ciphertext 252 using the agent keyset to extract the first party plaintext 254. In a step 668b, the agent electronic device 114 compares the first party plaintext 254 against the transaction identification plaintext communicated with the first agent cryptogram 270 (in the step 622).

Matching of the transaction identification plaintexts would mean that the correct agent 112 or transport vehicle picks and drives the correct user 104 to the destination. In a step 636, the first electronic device 120 communicates the first party message to the application server 108. In a step 638, the agent electronic device 114 communicates the first agent message to the agent server 116. In a step 640, the application server 108 communicates the first party message to the payment network server 102. In a step 642, the agent server 116 communicates the first agent message to the payment network server 102.

In a subsequent step 644, after verifying the user 104 and the merchant 106, the transaction module 102a of the payment network server 102 proceeds to process payment of the transaction, including the cost of reserving the agent 112 and the cost of the purchased merchandise, based on the payment token/user payment instrument. Payment of the transaction may be processed after the user 104 boards the transport vehicle or after the user 104 has completed the journey and arrived at the destination. Additionally, payment of the transaction is processed by the payment network server 102 together with other transactions between the user 104 and other merchants 106. For example, the user 104 may have purchased other merchandise from other merchants 106, such as a lunchbox to go with the cup of coffee. All the transactions made by the user 104 with the merchants 106 may be batched together so that a single payment is made on the payment token/user payment instrument.

During the journey in the transport vehicle, the user 104 may perform various transactions or activities using the agent electronic device 114. For example, the user 104 may be watching a movie on the first electronic device 120 while waiting for the transport vehicle. The user 104 may sync the first electronic device 120 with the agent electronic device 114 so that the movie can be cast from the first electronic device 120 to the agent electronic device 114 and the user 104 can continue watching the movie on the agent electronic device 114. The agent electronic device 114 may suggest various activities to the user 104 which may be based on the user's spending history and/or interests. For example, the user 104 may purchase some movie tickets using the agent electronic device 114. Details of these in-vehicle transactions performed using the agent electronic device 114 would be communicated from the agent electronic device 114 to the agent server 116 and subsequently to the payment network server 102. These in-vehicle transactions can be batched together and paid as a single payment at the end of the journey together with the transaction for reserving the transport vehicle and for purchasing the merchandise from the merchant 106.

As described in various embodiments above, said verification of transacting parties may be applied in various use cases involving the user 104 and one or more merchants 106, wherein the transactions between the user 104 and the merchants 106 are fulfilled by an agent 112, such as a transport vehicle. For example, the agent 112 is provided by a first merchant and the user 104 purchases merchandise from a second merchant 106 and possibly from more other merchants 106. The agent 112 may alternatively be provided by the merchant aggregator 110 for fulfilling the transactions made by the user 104 with the merchants 106. Also, while the embodiments of the present disclosure describe a transport vehicle as an example of the agent for a delivery or transport service, embodiments of the present disclosure may have other use cases or applications. For example, where two or more merchants 106 in a supply chain may be engaged by a user 104 (e.g. end consumer), embodiments of the present disclosure may be used to establish trust among all of the transacting parties to the transaction by use of the verification process using security keys as described herein.

Technical Architecture

As used herein, a server is a physical or cloud data processing system on which a server program runs. The server may be implemented in hardware or software, or a combination thereof. Some non-limiting examples of the server 102, application server 108, and agent server 116 include computers, laptops, mini-computers, mainframe computers, any non-transient and tangible machines that can execute a machine-readable code, cloud-based servers, distributed server networks, and a network of computer systems.

Figure 7:
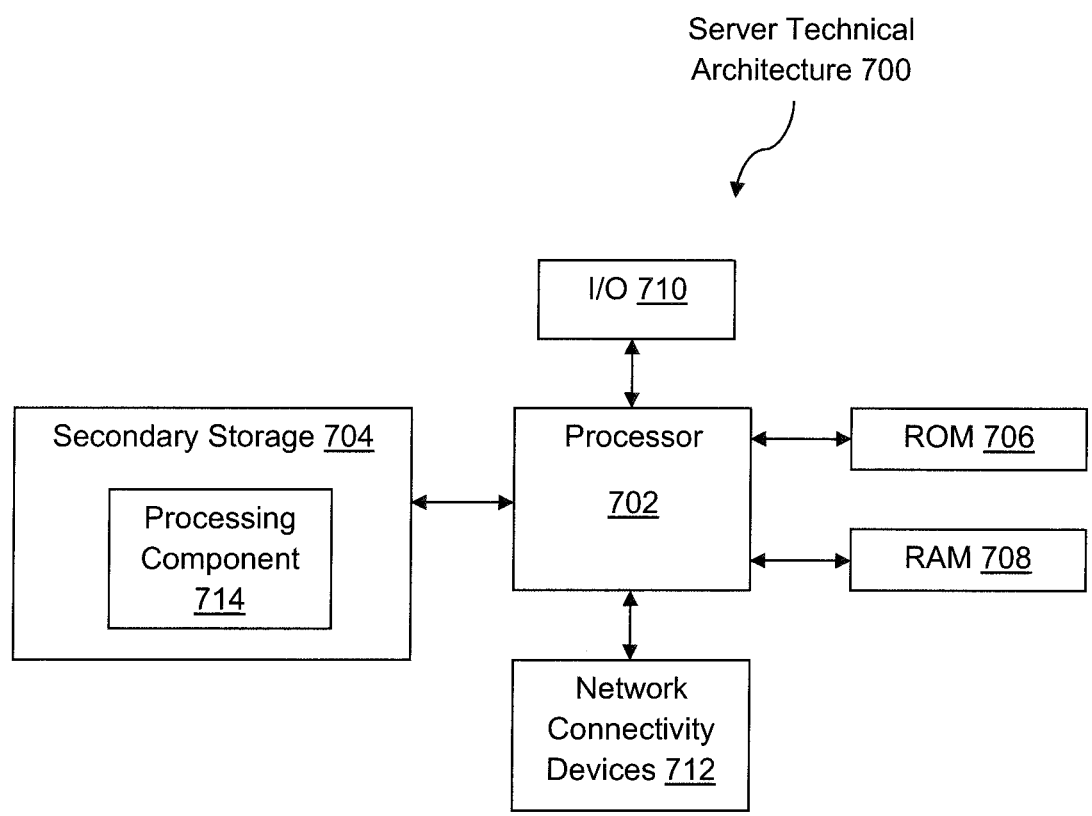
FIG. 7 is a block diagram illustration of the technical architecture of a server, in accordance with embodiments of the present disclosure.

FIG. 7 is a block diagram illustrating a technical architecture 700 of the payment network server 102. The application server 108, agent server 116, and the electronic devices 114/120/122 may share a similar technical architecture.

The technical architecture 700 includes a processor 702 (also referred to as a central processor unit or CPU) that is in communication with memory devices including secondary storage 704 (such as disk drives or memory cards), read-only memory (ROM) 706, and random-access memory (RAM) 708. The processor 702 may be implemented as one or more CPU chips. Various modules or components for performing various operations or steps of the methods 200/300/400/500/600 are configured as part of the processor 702 and such operations or steps are performed in response to non-transitory instructions operative or executed by the processor 702. The processor 702 includes suitable logic, circuitry, and/or interfaces to execute such operations or steps. Some non-limiting examples of the processor 702 include an application-specific integrated circuit (ASIC) processor, a reduced instruction set computing (RISC) processor, a complex instruction set computing (CISC) processor, a field-programmable gate array (FPGA), and the like.

The technical architecture 700 further includes input/output (I/O) devices 710, and system connectivity/network devices 712. The secondary storage 604 typically includes one or more memory cards, disk drives, tape drives, or other storage devices and is used for non-volatile storage of data and as an over-flow data storage device if RAM 708 is not large enough to hold all working data. Secondary storage 704 may be used to store programs which are loaded into RAM 708 when such programs are selected for execution.

The secondary storage 704 has a processing component 714 including non-transitory instructions operative by the processor 702 to perform various operations or steps of the methods 200/300/400/500/600 according to various embodiments of the present disclosure. The ROM 706 is used to store instructions and perhaps data which are read during program execution. The secondary storage 704, the ROM 706, and/or the RAM 708 may be referred to in some contexts as computer-readable storage media and/or non-transitory computer-readable media. Non-transitory computer-readable media include all computer-readable media, with the sole exception being a transitory propagating signal per se.

The I/O devices 710 may include printers, video monitors, liquid crystal displays (LCDs), plasma displays, touch screen displays, keyboards, keypads, switches, dials, mice, track balls, voice recognizers, card readers, paper tape readers, and/or other known input devices.

The system connectivity/network devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communication (NFC), radio frequency identity (RFID), and/or other air interface protocol radio transceiver cards, and other known system connectivity/network devices. These system connectivity/network devices 712 may enable the processor 702 to communicate with the Internet or one or more intranets. With such a system/network connection, it is contemplated that the processor 702 might receive information from the network, or might output information to the network in the course of performing the operations or steps of the methods 200/300/400/500/600. Such information, which is often represented as a sequence of instructions to be executed using processor 702, may be received from and outputted to the network, for example, in the form of a computer data signal embodied in a carrier wave.

The processor 702 executes instructions, codes, computer programs, scripts which it accesses from hard disk, floppy disk, optical disk (these various disk-based systems may all be considered secondary storage 704), flash drive, ROM 706, RAM 708, or the system connectivity/network devices 712. While only one processor 702 is shown, multiple processors may be present. Thus, while instructions may be discussed as executed by a processor, the instructions may be executed simultaneously, serially, or otherwise executed by one or multiple processors.

The technical architecture 700 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture 700 to provide the functionality of a number of servers that is not directly bound to the number of computers in the technical architecture 700. In an embodiment, the functionality disclosed above may be provided by executing the application and/or applications in a cloud computing environment. Cloud computing may include providing computing services via a system/network connection using dynamically scalable computing resources. A cloud computing environment may be established by an enterprise and/or may be hired on an as-needed basis from a third-party provider.

It is understood that by programming and/or loading executable instructions onto the technical architecture 700, at least one of the CPU 702, ROM 706, and RAM 708 are changed, transforming the technical architecture 700 in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by known design rules.

Furthermore, various embodiments of the present disclosure may be implemented as a method, apparatus, or article of manufacture using standard programming and/or engineering techniques to produce software, firmware, hardware, or any combination thereof to control a computer to implement the disclosed embodiments. For instance, various embodiments may be implemented as a computer-readable medium embedded with a computer-executable program, which encompasses a computer program accessible from any computer-readable storage device or storage media. For example, computer-readable media can include but are not limited to magnetic storage devices (e.g. hard disk, floppy disk, or magnetic strips), optical discs (e.g. compact disc (CD), digital versatile disc (DVD), or Blu-ray disc), smart cards, flash memory devices (e.g. card, stick, or key drive), and solid state drives/memory devices.

In the foregoing detailed description, embodiments of the present disclosure in relation to an electronic system and computerized method for verification of transacting parties to process transactions are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A computerized method for verification of transacting parties to process transactions, the method performed by a payment network server and comprising:
receiving, from an application server, details of a transaction comprising identification data of a first transacting party of the transaction, a second transacting party of the transaction, and an agent to fulfill the transaction;
generating an identification plaintext for the transaction;
identifying a first party keyset pre-generated for the first transacting party based on the identification data thereof;
identifying an agent keyset pre-generated for the agent based on the identification data thereof;
generating a first party cryptogram encrypted using the first party keyset, the first party cryptogram comprising a first party ciphertext encrypted using the agent keyset, the first party ciphertext comprising a first party plaintext representing the transaction identification plaintext;
generating a first agent cryptogram encrypted using the agent keyset, the first agent cryptogram comprising a first agent ciphertext encrypted using the first party keyset, the first agent ciphertext comprising a first agent plaintext representing the transaction identification plaintext;
communicating, to the application server, the transaction identification plaintext and the first party cryptogram for the application server to communicate to a first electronic device of the first transacting party, the first party cryptogram decryptable using the first party keyset to extract the first party ciphertext;
communicating, to an agent server, the transaction identification plaintext and the first agent cryptogram for the agent server to communicate to an electronic device of the agent, the first agent cryptogram decryptable using the agent keyset to extract the first agent ciphertext;
receiving, from the application server, a first party message after the first electronic device has received the first agent ciphertext from the agent electronic device, the first agent ciphertext decryptable using the first party keyset to extract the first agent plaintext;
receiving, from the agent server, a first agent message after the agent electronic device has received the first party ciphertext from the first electronic device, the first party ciphertext decryptable using the agent keyset to extract the first party plaintext; and
verifying the first transacting party and agent to facilitate fulfillment of the transaction,
wherein said verifying of the first transacting party is based on comparison of the first party plaintext extracted from the first party ciphertext against the transaction identification plaintext communicated with the first agent cryptogram; and
wherein said verifying of the agent is based on comparison of the first agent plaintext extracted from the first agent ciphertext against the transaction identification plaintext communicated with the first party cryptogram.

2. The method according to claim 1,
wherein the first party message indicates that the first electronic device has extracted the first agent plaintext from the first agent ciphertext and has compared the first agent plaintext against the transaction identification plaintext received with the first party cryptogram;
wherein the first agent message indicates that the agent electronic device has extracted the first party plaintext from the first party ciphertext and has compared the first party plaintext against the transaction identification plaintext received with the first agent cryptogram; and
wherein the first transacting party and agent are verified based on the first party message and first agent message.

3. The method according to claim 1, further comprising performing a security registration process comprising:
receiving, from the application server, a registration request for the first transacting party and comprising identification data of the first electronic device;
receiving, from the agent server, a registration request for the agent and comprising identification data of the agent electronic device;
generating the first party keyset based on the identification data of the first electronic device;
generating the agent keyset based on the identification data of the agent electronic device;
communicating, to the application server, the first party keyset for the application server to communicate to the first electronic device;
communicating, to the agent server, the agent keyset for the agent server to communicate to the agent electronic device.

4. The method according to claim 1,
wherein the agent is a transport vehicle for fulfilling the transaction between the first transacting party and the second transacting party;
wherein the first transacting party is a user and the second transacting party is a transport service provider of the transport vehicle; and
wherein the transaction relates to a reservation of the transport vehicle for the user.

5. The method according to claim 4, further comprising, after verifying the user and the transport vehicle, processing payment of the transaction using a payment token associated with a payment instrument of the user.

6. The method according to claim 1, further comprising:
identifying a second party keyset pre-generated for the second transacting party based on the identification data thereof;
generating a second party cryptogram encrypted using the second party keyset, the second party cryptogram comprising a second party ciphertext encrypted using the agent keyset, the second party ciphertext comprising a second party plaintext representing the transaction identification plaintext;
generating a second agent cryptogram encrypted using the agent keyset, the second agent cryptogram comprising a second agent ciphertext encrypted using the second party keyset, the second agent ciphertext comprising a second agent plaintext representing the transaction identification plaintext;
communicating, to the application server, the transaction identification plaintext and the second party cryptogram for the application server to communicate to a second electronic device of the second transacting party, the second party cryptogram decryptable using the second party keyset to extract the second party ciphertext;
communicating, to the agent server, the second agent cryptogram for the agent server to communicate to the agent electronic device, the second agent cryptogram decryptable using the agent keyset to extract the second agent ciphertext;
receiving, from the application server, a second party message after the second electronic device has received the second agent ciphertext from the agent electronic device, the second agent ciphertext decryptable using the second party keyset to extract the second agent plaintext;
receiving, from the agent server, a second agent message after the agent electronic device has received the second party ciphertext from the second electronic device, the second party ciphertext decryptable using the agent keyset to extract the second party plaintext;
verifying the second transacting party and agent to facilitate fulfillment of the transaction,
wherein said verifying of the second transacting party is based on comparison of the second party plaintext extracted from the second party ciphertext against the transaction identification plaintexts communicated with the second agent cryptogram; and
wherein said verifying of the agent is based on comparison of the second agent plaintext extracted from the second agent ciphertext against the transaction identification plaintext communicated with the second party cryptogram.

7. The method according to claim 6,
wherein the first party message indicates that the first electronic device has extracted the first agent plaintext from the first agent ciphertext and has compared the first agent plaintext against the transaction identification plaintext received with the first party cryptogram;
wherein the second party message indicates that the second electronic device has extracted the second agent plaintext from the second agent ciphertext and has compared the second agent plaintext against the transaction identification plaintext received with the second party cryptogram;
wherein the first and second agent messages indicate that the agent electronic device has extracted the first and second party plaintexts from the first and second party ciphertexts respectively and has compared the first and second party plaintexts against the transaction identification plaintexts received with the first and second agent cryptograms respectively; and
wherein the first and second transacting parties and the agent are verified based on the first and second party messages and the first and second agent messages.

8. The method according to claim 6, further comprising performing a security registration process comprising:
receiving, from the application server, a registration request for the first transacting party and comprising identification data of the first electronic device;
receiving, from the application server, a registration request for the second transacting party and comprising identification data of the second electronic device;
receiving, from the agent server, a registration request for the agent and comprising identification data of the agent electronic device;
generating the first party keyset based on the identification data of the first electronic device;
generating the second party keyset based on the identification data of the second electronic device;
generating the agent keyset based on the identification data of the agent electronic device;
communicating, to the application server, the first and second party keysets for the application server to communicate to the first and second electronic devices, respectively;
communicating, to the agent server, the agent keyset for the agent server to communicate to the agent electronic device.

9. The method according to claim 6,
wherein the agent is a transport vehicle for fulfilling the transaction between the first and second transacting parties;
wherein one of the first and second transacting parties is a user and the other is a merchant;
wherein the transaction relates to a purchase of merchandise by the user from the merchant; and
wherein the transport vehicle is provided to transport the merchandise from the merchant to the user.

10. The method according to claim 9, further comprising, after verifying the user and the merchant, processing payment of the transaction using a payment token associated with a payment instrument of the user.

11. The method according to claim 10, wherein payment of the transaction is processed together with other transactions between the user and other merchants.

12. The method according to claim 9, further comprising receiving, from the agent server, details of in-vehicle transactions performed using the agent electronic device of the transport vehicle.

13. A payment network server for verification of transacting parties to process transactions, the payment network server comprising:

a transaction module configured for:
  receiving, from an application server, details of a transaction comprising identification data of a first transacting party of the transaction, a second transacting party of the transaction, and an agent to fulfill the transaction; and
  generating an identification plaintext for the transaction;
a security module configured for:
  identifying a first party keyset pre-generated for the first transacting party based on the identification data thereof;
  identifying an agent keyset pre-generated for the agent based on the identification data thereof;
  generating a first party cryptogram encrypted using the first party keyset, the first party cryptogram comprising a first party ciphertext encrypted using the agent keyset, the first party ciphertext comprising a first party plaintext representing the transaction identification plaintext;
  generating a first agent cryptogram encrypted using the agent keyset, the first agent cryptogram comprising a first agent ciphertext encrypted using the first party keyset, the first agent ciphertext comprising a first agent plaintext representing the transaction identification plaintext;
  communicating, to the application server, the transaction identification plaintext and the first party cryptogram for the application server to communicate to a first electronic device of the first transacting party, the first party cryptogram decryptable using the first party keyset to extract the first party ciphertext; and
  communicating, to an agent server, the transaction identification plaintext and the first agent cryptogram for the agent server to communicate to an electronic device of the agent, the first agent cryptogram decryptable using the agent keyset to extract the first agent ciphertext; and
a verification module configured for:
  receiving, from the application server, a first party message after the first electronic device has received the first agent ciphertext from the agent electronic device, the first agent ciphertext decryptable using the first party keyset to extract the first agent plaintext;
  receiving, from the agent server, a first agent message after the agent electronic device has received the first party ciphertext from the first electronic device, the first party ciphertext decryptable using the agent keyset to extract the first party plaintext; and
  verifying the first transacting party and agent to facilitate fulfillment of the transaction,
  wherein said verifying of the first transacting party is based on comparison of the first party plaintext extracted from the first party ciphertext against the transaction identification plaintext communicated with the first agent cryptogram; and
  wherein said verifying of the agent is based on comparison of the first agent plaintext extracted from the first agent ciphertext against the transaction identification plaintext communicated with the first party cryptogram.

14. The payment network server according to claim 13, wherein the security module is further configured for:
  identifying a second party keyset pre-generated for the second transacting party based on the identification data thereof;
  generating a second party cryptogram encrypted using the second party keyset, the second party cryptogram comprising a second party ciphertext encrypted using the agent keyset, the second party ciphertext comprising a second party plaintext representing the transaction identification plaintext;
  generating a second agent cryptogram encrypted using the agent keyset, the second agent cryptogram comprising a second agent ciphertext encrypted using the second party keyset, the second agent ciphertext comprising a second agent plaintext representing the transaction identification plaintext;
  communicating, to the application server, the transaction identification plaintext and the second party cryptogram for the application server to communicate to a second electronic device of the second transacting party, the second party cryptogram decryptable using the second party keyset to extract the second party ciphertext; and
  communicating, to the agent server, the second agent cryptogram for the agent server to communicate to the agent electronic device, the second agent cryptogram decryptable using the agent keyset to extract the second agent ciphertext; and
wherein the verification module is further configured for:
  receiving, from the application server, a second party message after the second electronic device has received the second agent ciphertext from the agent electronic device, the second agent ciphertext decryptable using the second party keyset to extract the second agent plaintext;
  receiving, from the agent server, a second agent message after the agent electronic device has received the second party ciphertext from the second electronic device, the second party ciphertext decryptable using the agent keyset to extract the second party plaintext; and
  verifying the second transacting party and agent to facilitate fulfillment of the transaction,
  wherein said verifying of the second transacting party is based on comparison of the second party plaintext extracted from the second party ciphertext against the transaction identification plaintext communicated with the second agent cryptogram; and
  wherein said verifying of the agent is based on comparison of the second agent plaintext extracted from the second agent ciphertext against the transaction identification plaintext communicated with the second party cryptogram.

15. The payment network server according to claim 14, further comprising a registration module configured for:
  receiving, from the application server, a registration request for the first transacting party and comprising identification data of the first electronic device;
  receiving, from the application server, a registration request for the second transacting party and comprising identification data of the second electronic device;
  receiving, from the agent server, a registration request for the agent and comprising identification data of the agent electronic device;
  generating the first party keyset based on the identification data of the first electronic device;
  generating the second party keyset based on the identification data of the second electronic device;
  generating the agent keyset based on the identification data of the agent electronic device;

communicating, to the application server, the first and second party keysets for the application server to communicate to the first and second electronic devices, respectively;

communicating, to the agent server, the agent keyset for the agent server to communicate to the agent electronic device.

16. The payment network server according to claim 15, wherein the identification data of each electronic device comprises a hardware identifier and a salt value.

17. The payment network server according to claim 13, wherein the transaction module is further configured for processing payment of the transaction after verifying the transacting parties and the agent.

18. The payment network server according to claim 13, wherein the application server and agent server are the same server.

19. The payment network server according to claim 13, wherein each keyset comprises:
  a single symmetric key for encryption and decryption, the symmetric key communicable to the respective electronic device; or
  a pair of asymmetric keys comprising a public key for encryption and a private key for decryption, the private key communicable to the respective electronic device.

20. The payment network server according to claim 13, wherein the transaction identification plaintext comprises an identifier of the transaction, a timestamp of the transaction, and a nonce value.

* * * * *